(12) United States Patent
Miller et al.

(10) Patent No.: US 7,623,932 B2
(45) Date of Patent: Nov. 24, 2009

(54) RULE SET FOR ROOT CAUSE DIAGNOSTICS

(75) Inventors: John P. Miller, Eden Prairie, MN (US); Evren Eryurek, Edina, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 275 days.

(21) Appl. No.: 11/312,103

(22) Filed: Dec. 20, 2005

(65) Prior Publication Data
US 2006/0095394 A1    May 4, 2006

Related U.S. Application Data

(60) Continuation-in-part of application No. 09/972,078, filed on Oct. 5, 2001, now Pat. No. 7,085,610, which is a continuation-in-part of application No. 09/303,869, filed on May 3, 1999, now Pat. No. 6,397,114, which is a division of application No. 08/623,569, filed on Mar. 28, 1996, now Pat. No. 6,017,143.

(51) Int. Cl.
*G06F 19/00* (2006.01)
(52) U.S. Cl. .......................... 700/29; 700/51
(58) Field of Classification Search ................ 700/276, 700/108–112, 245, 21, 29, 51, 32–33, 48, 700/50; 62/172; 702/183, 188, 140, 33, 702/59; 705/1
See application file for complete search history.

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart | 128/2.05 R |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,849,637 A | 11/1974 | Caruso et al. | 235/151 |
| 3,855,858 A | 12/1974 | Cushing | 73/194 EM |
| 3,948,098 A | 4/1976 | Richardson et al. | 73/861.24 |
| 3,952,759 A | 4/1976 | Ottenstein | 137/12 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,083,031 A | 4/1978 | Pharo, Jr. | 367/135 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |

(Continued)

FOREIGN PATENT DOCUMENTS

CA      999950      11/1976

(Continued)

OTHER PUBLICATIONS

Penalva et al., A supervision Support System for Industrial Processess, Oct. 1993, IEEE, p. 57-65.*

(Continued)

*Primary Examiner*—Kidest Bahta
(74) *Attorney, Agent, or Firm*—Westman, Champlin & Kelly, P.A.

(57) ABSTRACT

A reduced rule set for identifying a root cause of an aberration in an industrial process is generated from a complete rule base. The rule base includes plurality of rules for the industrial process, and each rule comprises a condition of at least one process signal of the industrial process and a fault which corresponds to the condition of at least one process signal. Available process signals are identified. Rules are selectively removed from the rule base to produce the reduced rule set.

22 Claims, 6 Drawing Sheets

U.S. PATENT DOCUMENTS

| | | | | |
|---|---|---|---|---|
| 4,249,164 | A | 2/1981 | Tivy | 340/870.3 |
| 4,250,490 | A | 2/1981 | Dahlke | 340/870.37 |
| 4,255,964 | A | 3/1981 | Morison | 73/24.01 |
| 4,279,013 | A | 7/1981 | Cameron et al. | 340/870.37 |
| 4,337,516 | A | 6/1982 | Murphy et al. | 364/551 |
| 4,383,443 | A | 5/1983 | Langdon | 73/290 |
| 4,390,321 | A | 6/1983 | Langlois et al. | 417/15 |
| 4,399,824 | A | 8/1983 | Davidson | 128/736 |
| 4,417,312 | A | 11/1983 | Cronin et al. | 364/510 |
| 4,423,634 | A | 1/1984 | Audenard et al. | 73/587 |
| 4,459,858 | A | 7/1984 | Marsh | 73/861.12 |
| 4,463,612 | A | 8/1984 | Thompson | 73/861.22 |
| 4,517,468 | A | 5/1985 | Kemper et al. | 290/52 |
| 4,528,869 | A | 7/1985 | Kubo et al. | 74/695 |
| 4,530,234 | A | 7/1985 | Cullick et al. | 73/53 |
| 4,536,753 | A | 8/1985 | Parker | 340/566 |
| 4,540,468 | A | 9/1985 | Genco et al. | 162/49 |
| 4,571,689 | A | 2/1986 | Hildebrand et al. | 364/481 |
| 4,630,265 | A | 12/1986 | Sexton | 370/85 |
| 4,635,214 | A | 1/1987 | Kasai et al. | 364/551 |
| 4,642,782 | A | 2/1987 | Kemper et al. | 364/550 |
| 4,644,479 | A | 2/1987 | Kemper et al. | 364/550 |
| 4,649,515 | A | 3/1987 | Thompson et al. | 364/900 |
| 4,668,473 | A | 5/1987 | Agarwal | 422/62 |
| 4,686,638 | A | 8/1987 | Furuse | 364/558 |
| 4,696,191 | A | 9/1987 | Claytor et al. | 73/600 |
| 4,705,212 | A | 11/1987 | Miller et al. | 236/54 |
| 4,707,796 | A | 11/1987 | Calabro et al. | 364/552 |
| 4,720,806 | A | 1/1988 | Schippers et al. | 364/551 |
| 4,736,367 | A | 4/1988 | Wroblewski et al. | 370/85 |
| 4,736,763 | A | 4/1988 | Britton et al. | 137/10 |
| 4,758,308 | A | 7/1988 | Carr | 162/263 |
| 4,777,585 | A | 10/1988 | Kokawa et al. | 364/164 |
| 4,807,151 | A | 2/1989 | Citron | 364/510 |
| 4,818,994 | A | 4/1989 | Orth et al. | 340/501 |
| 4,831,564 | A | 5/1989 | Suga | 364/551.01 |
| 4,841,286 | A | 6/1989 | Kummer | 340/653 |
| 4,853,693 | A | 8/1989 | Eaton-Williams | 340/588 |
| 4,866,628 | A * | 9/1989 | Natarajan | 700/102 |
| 4,873,655 | A | 10/1989 | Kondraske | 364/553 |
| 4,907,167 | A | 3/1990 | Skeirik | 364/500 |
| 4,924,418 | A | 5/1990 | Bachman et al. | 364/550 |
| 4,926,364 | A | 5/1990 | Brotherton | 364/581 |
| 4,934,196 | A | 6/1990 | Romano | 73/861.38 |
| 4,939,753 | A | 7/1990 | Olson | 375/107 |
| 4,964,125 | A * | 10/1990 | Kim | 714/26 |
| 4,988,990 | A | 1/1991 | Warrior | 340/25.5 |
| 4,992,965 | A | 2/1991 | Holter et al. | 364/551.01 |
| 5,005,142 | A | 4/1991 | Lipchak et al. | 364/550 |
| 5,019,760 | A | 5/1991 | Chu et al. | 318/490 |
| 5,025,344 | A | 6/1991 | Maly et al. | 361/88 |
| 5,043,862 | A | 8/1991 | Takahashi et al. | 364/162 |
| 5,047,990 | A | 9/1991 | Gafos et al. | 367/6 |
| 5,053,815 | A | 10/1991 | Wendell | 355/208 |
| 5,057,774 | A | 10/1991 | Verhelst et al. | 324/537 |
| 5,067,099 | A | 11/1991 | McCown et al. | 364/550 |
| 5,081,598 | A | 1/1992 | Bellows et al. | 364/550 |
| 5,089,979 | A | 2/1992 | McEachern et al. | 364/571.04 |
| 5,089,984 | A | 2/1992 | Struger et al. | 395/650 |
| 5,098,197 | A | 3/1992 | Shepard et al. | 374/120 |
| 5,099,436 | A | 3/1992 | McCown et al. | 364/550 |
| 5,103,409 | A | 4/1992 | Shimizu et al. | 364/556 |
| 5,111,531 | A | 5/1992 | Grayson et al. | 395/23 |
| 5,119,318 | A * | 6/1992 | Paradies et al. | 706/52 |
| 5,121,467 | A | 6/1992 | Skeirik | 395/11 |
| 5,122,794 | A | 6/1992 | Warrior | 340/825.2 |
| 5,122,976 | A | 6/1992 | Bellows et al. | 364/550 |
| 5,130,936 | A | 7/1992 | Sheppard et al. | 364/551.01 |
| 5,134,574 | A | 7/1992 | Beaverstock et al. | 364/551.01 |
| 5,137,370 | A | 8/1992 | McCullock et al. | 374/173 |
| 5,142,612 | A | 8/1992 | Skeirik | 395/11 |
| 5,143,452 | A | 9/1992 | Maxedon et al. | 374/170 |
| 5,148,378 | A | 9/1992 | Shibayama et al. | 364/551.07 |
| 5,150,289 | A | 9/1992 | Badavas | 364/154 |
| 5,167,009 | A | 11/1992 | Skeirik | 395/27 |
| 5,175,678 | A | 12/1992 | Frerichs et al. | 364/148 |
| 5,193,143 | A | 3/1993 | Kaemmerer et al. | 395/51 |
| 5,197,114 | A | 3/1993 | Skeirik | 395/22 |
| 5,197,328 | A | 3/1993 | Fitzgerald | 73/168 |
| 5,212,765 | A | 5/1993 | Skeirik | 395/11 |
| 5,214,582 | A | 5/1993 | Gray | 364/424.03 |
| 5,216,226 | A | 6/1993 | Miyoshi | 219/497 |
| 5,224,203 | A | 6/1993 | Skeirik | 395/22 |
| 5,228,780 | A | 7/1993 | Shepard et al. | 374/175 |
| 5,235,527 | A | 8/1993 | Ogawa et al. | 364/571.05 |
| 5,265,031 | A | 11/1993 | Malczewski | 364/497 |
| 5,265,222 | A | 11/1993 | Nishiya et al. | 395/3 |
| 5,269,311 | A | 12/1993 | Kirchner et al. | 128/672 |
| 5,274,572 | A | 12/1993 | O'Neill et al. | 364/550 |
| 5,282,131 | A | 1/1994 | Rudd et al. | 364/164 |
| 5,282,261 | A | 1/1994 | Skeirik | 395/22 |
| 5,293,585 | A | 3/1994 | Morita | 395/52 |
| 5,303,181 | A | 4/1994 | Stockton | 365/96 |
| 5,305,230 | A | 4/1994 | Matsumoto et al. | 364/495 |
| 5,311,421 | A | 5/1994 | Nomura et al. | 364/157 |
| 5,317,520 | A | 5/1994 | Castle | 364/482 |
| 5,327,357 | A | 7/1994 | Feinstein et al. | 364/502 |
| 5,333,240 | A * | 7/1994 | Matsumoto et al. | 706/20 |
| 5,340,271 | A | 8/1994 | Freeman et al. | 415/1 |
| 5,347,843 | A | 9/1994 | Orr et al. | 73/3 |
| 5,349,541 | A | 9/1994 | Alexandro, Jr. et al. | 364/578 |
| 5,357,449 | A | 10/1994 | Oh | 364/551.01 |
| 5,361,628 | A | 11/1994 | Marko et al. | 73/116 |
| 5,365,423 | A | 11/1994 | Chand | 364/140 |
| 5,365,787 | A | 11/1994 | Hernandez et al. | 73/660 |
| 5,367,612 | A | 11/1994 | Bozich et al. | 395/22 |
| 5,369,674 | A | 11/1994 | Yokose et al. | 376/245 |
| 5,384,699 | A | 1/1995 | Levy et al. | 364/413.13 |
| 5,386,373 | A | 1/1995 | Keeler et al. | 364/577 |
| 5,388,465 | A | 2/1995 | Okaniwa et al. | 73/861.17 |
| 5,392,293 | A | 2/1995 | Hsue | 324/765 |
| 5,394,341 | A | 2/1995 | Kepner | 364/551.01 |
| 5,394,543 | A | 2/1995 | Hill et al. | 395/575 |
| 5,404,064 | A | 4/1995 | Mermelstein et al. | 310/319 |
| 5,408,406 | A | 4/1995 | Mathur et al. | 364/163 |
| 5,408,586 | A | 4/1995 | Skeirik | 395/23 |
| 5,410,495 | A | 4/1995 | Ramamurthi | 364/511.05 |
| 5,414,645 | A | 5/1995 | Hirano | 364/551.01 |
| 5,419,197 | A | 5/1995 | Ogi et al. | 73/659 |
| 5,430,642 | A | 7/1995 | Nakajima et al. | 364/148 |
| 5,434,774 | A | 7/1995 | Seberger | 364/172 |
| 5,436,705 | A | 7/1995 | Raj | 355/246 |
| 5,440,478 | A | 8/1995 | Fisher et al. | 364/188 |
| 5,442,639 | A | 8/1995 | Crowder et al. | 371/20.1 |
| 5,467,355 | A | 11/1995 | Umeda et al. | 364/571.04 |
| 5,469,070 | A | 11/1995 | Koluvek | 324/713 |
| 5,469,156 | A | 11/1995 | Kogura | 340/870.38 |
| 5,469,735 | A | 11/1995 | Watanabe | 73/118.1 |
| 5,469,749 | A | 11/1995 | Shimada et al. | 73/861.47 |
| 5,481,199 | A | 1/1996 | Anderson et al. | 324/705 |
| 5,481,200 | A | 1/1996 | Voegele et al. | 324/718 |
| 5,483,387 | A | 1/1996 | Bauhahn et al. | 359/885 |
| 5,485,753 | A | 1/1996 | Burns et al. | 73/720 |
| 5,486,996 | A | 1/1996 | Samad et al. | 364/152 |
| 5,488,697 | A | 1/1996 | Kaemmerer et al. | 395/51 |
| 5,489,831 | A | 2/1996 | Harris | 318/701 |
| 5,495,769 | A | 3/1996 | Broden et al. | 73/718 |
| 5,510,799 | A | 4/1996 | Wishart | 340/870.3 |
| 5,511,004 | A | 4/1996 | Dubost et al. | 364/551.01 |
| 5,526,293 | A | 6/1996 | Mozumder et al. | 364/578 |
| 5,539,638 | A | 7/1996 | Keeler et al. | 364/424.03 |
| 5,548,528 | A | 8/1996 | Keeler et al. | 364/497 |
| 5,555,190 | A | 9/1996 | Derby et al. | 364/510 |
| 5,560,246 | A | 10/1996 | Bottinger et al. | 73/861.15 |

| | | | | | | | |
|---|---|---|---|---|---|---|---|
| 5,561,599 | A | 10/1996 | Lu .................................. 364/164 | 5,970,430 | A | 10/1999 | Burns et al. ..................... 702/122 |
| 5,570,034 | A | 10/1996 | Needham et al. ............. 324/763 | 5,995,910 | A | 11/1999 | Discenzo ........................ 702/56 |
| 5,570,300 | A | 10/1996 | Henry et al. ............ 364/551.01 | 6,002,952 | A | 12/1999 | Diab et al. ...................... 600/310 |
| 5,572,420 | A | 11/1996 | Lu .................................. 364/153 | 6,006,338 | A | 12/1999 | Longsdorf et al. ............. 713/340 |
| 5,573,032 | A | 11/1996 | Lenz et al. ..................... 137/486 | 6,014,612 | A | 1/2000 | Larson et al. ................... 702/183 |
| 5,578,763 | A | 11/1996 | Spencer et al. ............. 73/861.08 | 6,014,902 | A | 1/2000 | Lewis et al. ................. 73/861.12 |
| 5,591,922 | A | 1/1997 | Segeral et al. .............. 73/861.04 | 6,016,523 | A | 1/2000 | Zimmerman et al. ............ 710/63 |
| 5,598,521 | A | 1/1997 | Kilgore et al. ................. 395/326 | 6,016,706 | A | 1/2000 | Yamamoto et al. ................. 9/6 |
| 5,600,148 | A | 2/1997 | Cole et al. .................... 250/495.1 | 6,017,143 | A | 1/2000 | Eryurek et al. ................. 700/51 |
| 5,608,650 | A | 3/1997 | McClendon et al. ........... 364/510 | 6,023,399 | A | 2/2000 | Kogure ......................... 361/23 |
| 5,623,605 | A | 4/1997 | Keshav et al. ............. 395/200.17 | 6,026,352 | A | 2/2000 | Burns et al. ..................... 702/182 |
| 5,629,870 | A | 5/1997 | Farag et al. ............... 364/551.01 | 6,038,579 | A | 3/2000 | Sekine ........................ 708/400 |
| 5,633,809 | A | 5/1997 | Wissenbach et al. ........... 364/510 | 6,045,260 | A | 4/2000 | Schwartz et al. ............... 374/183 |
| 5,637,802 | A | 6/1997 | Frick et al. ...................... 73/724 | 6,046,642 | A | 4/2000 | Brayton et al. ................. 330/296 |
| 5,640,491 | A | 6/1997 | Bhat et al. ....................... 395/22 | 6,047,220 | A | 4/2000 | Eryurek et al. ................. 700/28 |
| 5,644,240 | A | 7/1997 | Brugger ........................... 324/439 | 6,047,222 | A | 4/2000 | Burns et al. ..................... 700/79 |
| 5,654,869 | A | 8/1997 | Ohi et al. ......................... 361/540 | 6,052,655 | A | 4/2000 | Kobayashi et al. ............ 702/184 |
| 5,661,668 | A | 8/1997 | Yemini et al. ................... 364/550 | 6,061,603 | A | 5/2000 | Papadopoulos et al. ........ 700/83 |
| 5,665,899 | A | 9/1997 | Willcox ............................. 73/1.63 | 6,072,150 | A | 6/2000 | Sheffer ..................... 219/121.83 |
| 5,669,713 | A | 9/1997 | Schwartz et al. ................... 374/1 | 6,094,600 | A | 7/2000 | Sharpe, Jr. et al. ............. 700/19 |
| 5,671,335 | A | 9/1997 | Davis et al. ...................... 395/23 | 6,112,131 | A | 8/2000 | Ghorashi et al. ............. 700/142 |
| 5,672,247 | A | 9/1997 | Pangalos et al. ................. 162/65 | 6,119,047 | A | 9/2000 | Eryurek et al. ................. 700/28 |
| 5,675,504 | A | 10/1997 | Serodes et al. ................. 364/496 | 6,119,529 | A | 9/2000 | Di Marco et al. .......... 73/861.68 |
| 5,675,724 | A | 10/1997 | Beal et al. ................... 395/182.02 | 6,139,180 | A | 10/2000 | Usher et al. ....................... 374/1 |
| 5,680,109 | A | 10/1997 | Lowe et al. ..................... 340/608 | 6,151,560 | A | 11/2000 | Jones ............................. 702/58 |
| 5,682,317 | A | 10/1997 | Keeler et al. ................ 364/431.03 | 6,179,964 | B1 | 1/2001 | Begemann et al. ............ 162/198 |
| 5,682,476 | A | 10/1997 | Tapperson et al. .............. 370/225 | 6,182,501 | B1 | 2/2001 | Furuse et al. ................. 73/49.2 |
| 5,700,090 | A | 12/1997 | Eryurek .......................... 374/210 | 6,192,281 | B1 | 2/2001 | Brown et al. ..................... 700/2 |
| 5,703,575 | A | 12/1997 | Kirpatrick .................. 340/870.17 | 6,195,591 | B1 | 2/2001 | Nixon et al. ...................... 700/2 |
| 5,704,011 | A | 12/1997 | Hansen et al. .................. 395/22 | 6,199,018 | B1 | 3/2001 | Quist et al. ..................... 702/34 |
| 5,705,754 | A | 1/1998 | Keita et al. ................. 73/861.357 | 6,209,048 | B1 | 3/2001 | Wolff ............................ 710/62 |
| 5,705,978 | A | 1/1998 | Frick et al. ....................... 340/511 | 6,236,948 | B1 | 5/2001 | Eck et al. ........................ 702/45 |
| 5,708,211 | A | 1/1998 | Jepson et al. ................. 73/861.04 | 6,237,424 | B1 | 5/2001 | Salmasi et al. ............. 73/861.17 |
| 5,708,585 | A | 1/1998 | Kushion ..................... 364/431.061 | 6,260,004 | B1 | 7/2001 | Hays et al. ..................... 702/183 |
| 5,710,370 | A | 1/1998 | Shanahan et al. ................. 73/1.35 | 6,263,487 | B1 | 7/2001 | Stripf et al. ....................... 717/1 |
| 5,710,708 | A | 1/1998 | Wiegland ..................... 364/470.1 | 6,272,438 | B1 | 8/2001 | Cunningham et al. .......... 702/56 |
| 5,713,668 | A | 2/1998 | Lunghofer et al. ............. 374/179 | 6,289,735 | B1 | 9/2001 | Dister et al. ...................... 73/579 |
| 5,719,378 | A | 2/1998 | Jackson, Jr. et al. ........... 219/497 | 6,298,377 | B1 | 10/2001 | Hartikainen et al. ......... 709/223 |
| 5,731,522 | A | 3/1998 | Sittler .............................. 73/708 | 6,307,483 | B1 | 10/2001 | Westfield et al. ....... 340/870.11 |
| 5,736,649 | A | 4/1998 | Kawasaki et al. .......... 73/861.23 | 6,311,136 | B1 | 10/2001 | Henry et al. ..................... 702/45 |
| 5,741,074 | A | 4/1998 | Wang et al. ..................... 374/185 | 6,317,701 | B1 | 11/2001 | Pyostsia et al. ............... 702/188 |
| 5,742,845 | A | 4/1998 | Wagner ........................... 395/831 | 6,327,914 | B1 | 12/2001 | Dutton ..................... 73/861.356 |
| 5,746,511 | A | 5/1998 | Eryurek et al. ..................... 374/2 | 6,347,252 | B1 | 2/2002 | Behr et al. ....................... 700/2 |
| 5,747,701 | A | 5/1998 | Marsh et al. ................. 73/861.23 | 6,356,191 | B1 | 3/2002 | Kirkpatrick et al. .......... 340/501 |
| 5,752,008 | A | 5/1998 | Bowling ........................... 395/500 | 6,360,277 | B1 | 3/2002 | Ruckley et al. ................... 9/250 |
| 5,764,539 | A | 6/1998 | Rani .................................. 364/557 | 6,370,448 | B1 | 4/2002 | Eryurek et al. ............... 700/282 |
| 5,764,891 | A | 6/1998 | Warrior .......................... 395/200.2 | 6,377,859 | B1 | 4/2002 | Brown et al. ..................... 700/79 |
| 5,781,024 | A | 7/1998 | Blomberg et al. ............. 324/763 | 6,378,364 | B1 | 4/2002 | Pelletier et al. ............ 73/152.47 |
| 5,781,878 | A | 7/1998 | Mizoguchi et al. ............ 701/109 | 6,396,426 | B1 | 5/2002 | Balard et al. .................... 341/120 |
| 5,790,413 | A | 8/1998 | Bartusiak et al. ............... 364/485 | 6,397,114 | B1 | 5/2002 | Eryurek et al. ................. 700/51 |
| 5,796,006 | A | 8/1998 | Bellet et al. ........................ 73/61 | 6,405,099 | B1 | 6/2002 | Nagai et al. .................... 700/159 |
| 5,801,689 | A | 9/1998 | Huntsman ........................ 345/329 | 6,425,038 | B1 | 7/2002 | Sprecher ....................... 710/269 |
| 5,805,442 | A | 9/1998 | Crater et al. ...................... 364/138 | 6,434,504 | B1 | 8/2002 | Eryurek et al. ............... 702/130 |
| 5,817,950 | A | 10/1998 | Wiklund et al. ............ 73/861.66 | 6,449,574 | B1 | 9/2002 | Eryurek et al. ................. 702/99 |
| 5,825,664 | A | 10/1998 | Warrior et al. ..................... 700/7 | 6,473,656 | B1 | 10/2002 | Langels et al. ................. 700/17 |
| 5,828,567 | A | 10/1998 | Eryurek et al. ................. 700/79 | 6,473,710 | B1 | 10/2002 | Eryurek ....................... 702/133 |
| 5,829,876 | A | 11/1998 | Schwartz et al. ................... 374/1 | 6,480,793 | B1 | 11/2002 | Martin ........................... 702/45 |
| 5,848,383 | A | 12/1998 | Yuuns ........................... 702/102 | 6,492,921 | B1 | 12/2002 | Kunitani et al. ............... 341/118 |
| 5,854,993 | A | 12/1998 | Crichnik ........................ 702/54 | 6,493,689 | B2 | 12/2002 | Kotoulas et al. ............... 706/23 |
| 5,854,994 | A | 12/1998 | Canada et al. ................. 702/56 | 6,497,222 | B2 | 12/2002 | Bolz et al. ..................... 123/476 |
| 5,859,964 | A | 1/1999 | Wang et al. ................ 395/185.01 | 6,505,517 | B1 | 1/2003 | Eryurek et al. ............. 73/861.08 |
| 5,869,772 | A | 2/1999 | Storer ......................... 73/861.24 | 6,519,546 | B1 | 2/2003 | Eryurek et al. ............... 702/130 |
| 5,876,122 | A | 3/1999 | Eryurek ........................ 374/183 | 6,532,392 | B1 | 3/2003 | Eryurek et al. ............... 700/54 |
| 5,880,376 | A | 3/1999 | Sai et al. ...................... 73/861.08 | 6,539,267 | B1 | 3/2003 | Eryurek et al. ............... 700/51 |
| 5,887,978 | A | 3/1999 | Lunghofer et al. ............. 374/179 | 6,546,814 | B1 | 4/2003 | Choe et al. ................ 73/862.08 |
| 5,908,990 | A | 6/1999 | Cummings ................. 73/861.22 | 6,556,145 | B1 | 4/2003 | Kirkpatrick et al. ..... 340/870.17 |
| 5,923,557 | A | 7/1999 | Eidson ......................... 364/471.03 | 6,564,268 | B1 | 5/2003 | Davis et al. ..................... 710/11 |
| 5,924,086 | A | 7/1999 | Mathur et al. .................... 706/25 | 6,567,006 | B1 | 5/2003 | Lander et al. .................. 340/605 |
| 5,926,778 | A | 7/1999 | Pöppel ........................... 702/130 | 6,594,603 | B1 | 7/2003 | Eryurek et al. ............... 702/104 |
| 5,934,371 | A | 8/1999 | Bussear et al. ................. 166/53 | 6,597,997 | B2 | 7/2003 | Tingley ......................... 702/34 |
| 5,936,514 | A | 8/1999 | Anderson et al. ......... 340/310.01 | 6,601,005 | B1 | 7/2003 | Eryurek et al. ............... 702/104 |
| 5,940,290 | A | 8/1999 | Dixon ............................ 364/138 | 6,611,775 | B1 | 8/2003 | Coursolle et al. ............. 702/65 |
| 5,956,663 | A | 9/1999 | Eryurek et al. ............... 702/183 | 6,615,149 | B1 | 9/2003 | Wehrs ........................... 702/76 |

| | | | | | | |
|---|---|---|---|---|---|---|
| 6,618,856 | B2 * | 9/2003 | Coburn et al. .............. 717/135 | GB | 1 534 288 | 11/1978 |
| 6,654,697 | B1 | 11/2003 | Eryurek et al. ............... 702/47 | GB | 2 310 346 A | 8/1997 |
| 6,701,274 | B1 | 3/2004 | Eryurek et al. .............. 702/140 | GB | 2 317 969 | 4/1998 |
| 6,727,812 | B2 | 4/2004 | Sauler et al. ................ 340/511 | GB | 2 342 453 A | 4/2000 |
| 6,751,560 | B1 | 6/2004 | Tingley et al. ............... 702/51 | GB | 2 347 232 A | 8/2000 |
| 6,758,168 | B2 | 7/2004 | Koskinen et al. ............. 122/7 | JP | 56031573 | 3/1981 |
| 6,904,476 | B2 | 6/2005 | Hedtke ........................ 710/72 | JP | 57196619 | 2/1982 |
| 6,915,364 | B1 | 7/2005 | Christensen et al. ........ 710/104 | JP | 58-129316 | 8/1983 |
| 7,040,179 | B2 | 5/2006 | Drahm et al. .......... 73/861.356 | JP | 59-116811 | 7/1984 |
| 7,058,542 | B2 | 6/2006 | Hauhia et al. ............... 702/183 | JP | 59-163520 | 9/1984 |
| 7,085,610 | B2 * | 8/2006 | Eryurek et al. .............. 700/29 | JP | 59176643 | 10/1984 |
| 7,099,852 | B2 | 8/2006 | Unsworth et al. ............ 706/23 | JP | 59-211196 | 11/1984 |
| 7,109,883 | B2 | 9/2006 | Trimble et al. ......... 340/870.16 | JP | 59-211896 | 11/1984 |
| 7,171,281 | B2 | 1/2007 | Weber et al. ................. 700/96 | JP | 60-000507 | 1/1985 |
| 7,254,518 | B2 | 8/2007 | Eryurek ...................... 702/183 | JP | 60-76619 | 5/1985 |
| 2002/0013629 | A1 | 1/2002 | Nixon et al. | JP | 60-131495 | 7/1985 |
| 2002/0032544 | A1 | 3/2002 | Reid et al. .................. 702/183 | JP | 60-174915 | 9/1985 |
| 2002/0077711 | A1 | 6/2002 | Nixon ......................... 700/19 | JP | 62-30915 | 2/1987 |
| 2002/0121910 | A1 | 9/2002 | Rome et al. ................. 324/718 | JP | 62-080535 | 4/1987 |
| 2002/0145568 | A1 | 10/2002 | Winter ....................... 343/701 | JP | 62-50901 | 9/1987 |
| 2002/0148644 | A1 | 10/2002 | Schultz et al. ................ 175/39 | JP | 63-169532 | 7/1988 |
| 2002/0194547 | A1 | 12/2002 | Christensen et al. .......... 714/43 | JP | 64-01914 | 1/1989 |
| 2003/0033040 | A1 | 2/2003 | Billings ....................... 700/97 | JP | 64-72699 | 3/1989 |
| 2003/0045962 | A1 | 3/2003 | Eryurek et al. | JP | 11-87430 | 7/1989 |
| 2003/0150908 | A1 * | 8/2003 | Pokorny et al. .............. 235/375 | JP | 2-05105 | 1/1990 |
| 2003/0233161 | A1 * | 12/2003 | Cheng et al. ................ 700/108 | JP | 3-229124 | 10/1991 |
| 2004/0073843 | A1 * | 4/2004 | Dean et al. .................... 714/37 | JP | 4-70906 | 3/1992 |
| 2004/0128034 | A1 | 7/2004 | Lenker et al. ............... 700/282 | JP | 5-122768 | 5/1993 |
| 2004/0199361 | A1 * | 10/2004 | Lu et al. ..................... 702/183 | JP | 6-95882 | 4/1994 |
| 2004/0249583 | A1 | 12/2004 | Eryurek et al. ............... 702/47 | JP | 06242192 | 9/1994 |
| 2005/0072239 | A1 | 4/2005 | Longsdorf et al. ............ 73/649 | JP | 06-248224 | 10/1994 |
| 2006/0075009 | A1 | 4/2006 | Lenz et al. ................... 708/160 | JP | 7-063586 | 3/1995 |
| 2006/0277000 | A1 | 12/2006 | Wehrs ......................... 702/183 | JP | 07234988 | 9/1995 |
| 2007/0010968 | A1 | 1/2007 | Longsdorf et al. ........... 702/183 | JP | 8-054923 | 2/1996 |

FOREIGN PATENT DOCUMENTS

| | | | | | |
|---|---|---|---|---|---|
| CN | 1185841 | 6/1998 | JP | 8-102241 | 4/1996 |
| DE | 32 13 866 A1 | 10/1983 | JP | 08-114638 | 5/1996 |
| DE | 35 40 204 C1 | 9/1986 | JP | 8-136386 | 5/1996 |
| DE | 40 08 560 A1 | 9/1990 | JP | 8-166309 | 6/1996 |
| DE | 43 43 747 | 6/1994 | JP | 8-247076 | 9/1996 |
| DE | 44 33 593 A1 | 6/1995 | JP | 8-313466 | 11/1996 |
| DE | 195 02 499 A1 | 8/1996 | JP | 2712625 | 10/1997 |
| DE | 296 00 609 U1 | 3/1997 | JP | 2712701 | 10/1997 |
| DE | 197 04 694 A1 | 8/1997 | JP | 2753592 | 3/1998 |
| DE | 19930660 A1 | 7/1999 | JP | 07225530 | 5/1998 |
| DE | 199 05 071 | 8/2000 | JP | 10-232170 | 9/1998 |
| DE | 19905071 A1 | 8/2000 | JP | 11-083575 | 3/1999 |
| DE | 299 17 651 U1 | 12/2000 | RU | 2 190 267 | 9/2002 |
| DE | 19947129 | 4/2001 | WO | WO 94/25933 | 11/1994 |
| DE | 100 36 971 A1 | 2/2002 | WO | WO 95/23361 | 8/1995 |
| DE | 102 23 725 A1 | 4/2003 | WO | WO 96/11389 | 4/1996 |
| EP | 0 122 622 A1 | 10/1984 | WO | WO 96/12993 | 5/1996 |
| EP | 0 413 814 A1 | 2/1991 | WO | WO 96/39617 | 12/1996 |
| EP | 0 487 419 A2 | 5/1992 | WO | WO 97/21157 | 6/1997 |
| EP | 0 512 794 A2 | 11/1992 | WO | WO 97/25603 | 7/1997 |
| EP | 0 594 227 A1 | 4/1994 | WO | WO 98/06024 | 2/1998 |
| EP | 0 624 847 A1 | 11/1994 | WO | WO 98/13677 | 4/1998 |
| EP | 0 644 470 A2 | 3/1995 | WO | WO 98/14855 | 4/1998 |
| EP | 0 697 586 A2 | 2/1996 | WO | WO 98/20469 | 5/1998 |
| EP | 0 749 057 A1 | 12/1996 | WO | WO 98/39718 | 9/1998 |
| EP | 0 825 506 A2 | 7/1997 | WO | WO 99/19782 | 4/1999 |
| EP | 0 827 096 A2 | 9/1997 | WO | WO 00/41050 | 7/2000 |
| EP | 0 838 768 A2 | 9/1997 | WO | WO 00/50851 | 8/2000 |
| EP | 0 807 804 A2 | 11/1997 | WO | WO 00/55700 | 9/2000 |
| EP | 1 058 093 A1 | 5/1999 | WO | WO 00/70531 | 11/2000 |
| EP | 0 335 957 B1 | 11/1999 | WO | WO 01/01213 A1 | 1/2001 |
| EP | 1 022 626 A2 | 7/2000 | WO | WO 01/19440 | 3/2001 |
| FR | 2 302 514 | 9/1976 | WO | WO 01/77766 | 10/2001 |
| FR | 2 334 827 | 7/1977 | WO | WO 01/90704 A2 | 11/2001 |
| GB | 928704 | 6/1963 | WO | WO 02/27418 | 4/2002 |
| GB | 1 534 280 | 11/1978 | | | |

WO  WO 03/081002 A1  10/2003

OTHER PUBLICATIONS

"Notification of Transmittal of the International Search Report and the Written Opinion of the International Searching Authority", PCT/US2006/047612.
"Invitation to Pay Additional Fees and Partial International Search Report", PCT/US2006/047612.
"Notification of Transmittal of International Search Report and the Written Opinion", PCT/US2006/037535.
U.S. Appl. No. 09/257,896, filed Feb. 25, 1999, Eryurek et al.
U.S. Appl. No. 09/409,098, filed Sep. 30, 1999, Eryurek et al.
U.S. Appl. No. 09/799,824, filed Mar. 5, 2001, Rome et al.
U.S. Appl. No. 09/855,179, filed May 14, 2001, Eryurek et al.
U.S. Appl. No. 09/852,102, filed May 9, 2001, Eryurek et al.
U.S. Appl. No. 09/972,078, filed Oct. 5, 2001, Eryurek et al.
U.S. Appl. No. 10/635,944, filed Aug. 7, 2003, Huisenga et al.
"A TCP\IP Tutorial" by, Socolofsky et al., Spider Systems Limited, Jan. 1991 pp. 1-23.
"Approval Standards For Explosionproof Electrical Equipment General Requirements", Factory Mutual Research, Cl. No. 3615, Mar. 1989, pp. 1-34.
"Approval Standard Intrinsically Safe Apparatus and Associated Apparatus For Use In Class I, II, and III, Division 1 Hazardous (Classified) Locations", Factory Mutual Research, Cl. No. 3610, Oct. 1988, pp. 1-70.
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"CompProcessor For Piezoresistive Sensors" MCA Technologies Inc. (MCA7707), pp. 1-8.
"Ethernet emerges as viable, inexpensive fieldbus", Paul G. Schreier, Personal Engineering, Dec. 1997, p. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50.02-1992, pp. 1-93.
"Fieldbus Standard for Use in Industrial Control Systems Part 3: Data Link Service Definition", ISA-S50.02-1997, Part 3, Aug. 1997, pp. 1-159.
Fieldbus Standard For Use in Industrial Control Systems Part 4: Data Link Protocol Specification, ISA-S50.02-1997, Part 4, Aug. 1997, pp. 1-148.
"Fieldbus Support For Process Analysis" by, Blevins et al., Fisher-Rosemount Systems, Inc., 1995, pp. 121-128.
"Fieldbus Technical Overview Understanding FOUNDATION™ fieldbus technology", Fisher-Rosemount, 1998, pp. 1-23.
"Hypertext Transfer Protocol—HTTP/1.0" by, Berners-Lee et al., MIT/LCS, May 1996, pp. 1-54.
"Infranets, Intranets, and the Internet" by, Pradip Madan, Echelon Corp, Sensors, Mar. 1997, pp. 46-50.
"Internet Technology Adoption into Automation" by, Fondl et al., Automation Business, pp. 1-5.
"Internet Protocol Darpa Internet Program Protocol Specification" by, Information Sciences Institute, University of Southern California, RFC 791, Sep. 1981, pp. 1-43.
"Introduction to Emit", emWare, Inc., 1997, pp. 1-22.
"Introduction to the Internet Protocols" by, Charles L. Hedrick, Computer Science Facilities Group, Rutgers University, Oct. 3, 1988, pp. 1-97.
"Is There A Future For Ethernet in Industrial Control?", Miclot et al., Plant Engineering, Oct. 1988, pp. 44-46, 48, 50.
LFM/SIMA Internet Remote Diagnostics Research Project Summary Report, Stanford University, Jan. 23, 1997, pp. 1-6.
"Managing Devices with the Web" by, Howard et al., Byte, Sep. 1997, pp. 45-64.
"Modular Microkernel Links GUI And Browser For Embedded Web Devices" by, Tom Williams, pp. 1-2.
"PC Software Gets Its Edge From Windows, Components, and the Internet", Wayne Labs, I&CS, Mar. 1997, pp. 23-32.

Proceedings Sensor Expo, Aneheim, California, Produced by Expocon Managemnet Associates, Inc., Apr. 1996, pp. 9-21.
Proceedings Sensor Expo, Boston, Massachuttes, Produced by Expocon Management Associates, Inc., May 1997, pp. 1-416.
"Smart Sensor Network of the Future" by, Jay Warrior, Sensors, Mar. 1997, pp. 40-45.
"The Embedded Web Site" by, John R. Hines, IEEE Spectrum, Sep. 1996, p. 23.
"Transmission Control Protocol: Darpa Internet Program Protocol Specification" Information Sciences Institute, Sep. 1981, pp. 1-69.
"On-Line Statistical Process Control for a Glass Tank Ingredient Scale," by R.A. Weisman, *IFAC real Time Programming*, 1985, pp. 29-38.
"The Performance of Control Charts for Monitoring Process Variation," by C. Lowry et al., *Commun. Statis.—Simula.*, 1995, pp. 409-437.
"A Knowledge-Based Approach for Detection and Diagnosis of Out-Of-Control Events in Manufacturing Processes," by P. Love et al., IEEE, 1989, pp. 736-741.
"Advanced Engine Diagnostics Using Universal Process Modeling", by P. O'Sullivan, *Presented at the 1996 SAE Conference on Future Transportation Technology*, pp. 1-9.
Parallel, Fault-Tolerant Control and Diagnostics System for Feedwater Regulation in PWRS, by E. Eryurek et al., *Proceedings of the American Power Conference*.
"Programmable Hardware Architectures for Sensor Validation", by M.P. Henry et al., *Control Eng. Practice*, vol. 4, No. 10., pp. 1339-1354, (1996).
"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.
"Signal Processing, Data Handling and Communications: The Case for Measurement Validation", by M.P. Henry, *Department of Engineering Science*, Oxford University.
"Smart Temperature Measurement in the '90s", by T. Kerlin et al., *C&I*, (1990).
"Software-Based Fault-Tolerant Control Design for Improved Power Plant Operation," *IEEE/IFAC Joint Symposium on Computer-Aided Control System Design*, Mar. 7-9, 1994 pp. 585-590.
A Standard Interface for Self-Validating Sensors, by M.P. Henry et al., *Report No. QUEL 1884/91*, (1991).
"Taking Full Advantage of Smart Transmitter Technology Now," by G. Orrison, *Control Engineering*, vol. 42, No. 1, Jan. 1995.
"Using Artificial Neural Networks to Identify Nuclear Power Plant States," by Israel E. Alguindigue et al., pp. 1-4.
"Application of Neural Computing Paradigms for Signal Validation," by B.R. Upadhyaya et al., *Department of Nuclear Engineering*, pp. 1-18.
"Application of Neural Networks for Sensor Validation and Plant Monitoring," by B. Upadhyaya et al., *Nuclear Technology*, vol. 97, No. 2, Feb. 1992 pp. 170-176.
"Automated Generation of Nonlinear System Characterization for Sensor Failure Detection," by B.R. Upadhyaya et al., *ISA*, 1989 pp. 269-274.
"In Situ Calibration of Nuclear Plant Platinum Resistance Thermometers Using Johnson Noise Methods," *EPRI*, Jun. 1983.
"Johnson Noise Thermometer for High Radiation and High-Temperature Environments," by L. Oakes et al., *Fifth Symposium on Space Nuclear Power Systems*, Jan. 1988, pp. 2-23.
"Development of a Resistance Thermometer For Use Up to 1600° C", by M.J. de Groot et al., *CAL LAB*, Jul./Aug. 1996, pp. 38-41.
"Survey, Applications, And Prospects of Johnson Noise Thermometry," by T. Blalock et al., *Electrical Engineering Department*, 1981 pp. 2-11.
"Noise Thermometry for Industrial and Metrological Applications at KFA Julich," by H. Brixy et al., *7th International Symposium on Temperature*, 1992.
"Johnson Noise Power Thermometer and its Application in Process Temperature Measurement," by T.V. Blalock et al., *American Institute of Physics* 1982, pp. 1249-1259.
"Field-based Architecture is Based on Open Systems, Improves Plant Performance", by P. Cleaveland, *I&CS*, Aug. 1996, pp. 73-74.

"Tuned-Circuit Dual-Mode Johnson Noise Thermometers," by R.L. Shepard et al., Apr. 1992.

"Tuned-Circuit Johnson Noise Thermometry," by Michael Roberts et al., *7th Symposium on Space Nuclear Power Systems*, Jan. 1990.

"Smart Field Devices Provide New Process Data, Increase System Flexibility," by Mark Boland, *I&CS*, Nov. 1994, pp. 45-51.

"Wavelet Analysis of Vibration, Part I: Theory[1]," by D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibration and Acoustics*, vol. 116, Oct. 1994, pp. 417-425.

"Development of a Long-Life, High-Reliability Remotely Operated Johnson Noise Thermometer," by R.L. Shepard et al., *ISA*, 1991, pp. 77-84.

"Application of Johnson Noise Thermometry to Space Nuclear Reactors," by M.J. Roberts et al., *Presented at the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pp. 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp. 1605-1608.

"Development and Application of Neural Network Algorithms For Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68-88.

"Keynote Paper: Hardware Compilation-A New Technique for Rapid Prototyping of Digital Systems-Applied to Sensor Validation", by M.P. Henry, *Control Eng. Practice*, vol. 3, No. 7., pp. 907-924, (1995).

"The Implications of Digital Communications on Sensor Validation", by M. Henry et al., *Report No. QUEL 1912/92*, (1992).

"In-Situ Response Time Testing of Thermocouples", *ISA*, by H.M. Hashemian et al., Paper No. 89-0056, pp. 587-593, (1989).

"An Integrated Architecture For Signal Validation in Power Plants," by B.R. Upadhyaya et al., *Third IEEE International Symposium on Intelligent Control*, Aug. 24-26, 1988, pp. 1-6.

"Integration of Multiple Signal Validation Modules for Sensor Monitoring," by B. Upadhyaya et al., *Department of Nuclear Engineering*, Jul. 8, 1990, pp. 1-6.

"Intelligent Behaviour for Self-Validating Sensors", by M.P. Henry, *Advances In Measurement*, pp. 1-7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151-162.

"Thermocouple Continuity Checker," IBM Technical Disclosure Bulletin, vol. 20, No. 5, p. 1954 (Oct. 1977).

"A Self-Validating Thermocouple," Janice C-Y et al., IEEE Transactions on Control Systems Technology, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6[Th]. WWW Conference Workshop on Embedded Web Technology, Santa Clara, CA (Apr. 7, 1997).

Microsoft Press Computer Dictionary, 3rd Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).

"Transient Pressure Signals in Mechanical Heart Valve Caviation," by Z.J. Wu et al., pp. M555-M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED-vol. 28, pp. 297-298 (Nov. 6-11, 1994).

"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).

"Developing Predictive Models for Cavitation Erosion," *Codes and Standards in A Global Environment*, PVP-vol. 259, pp. 189-192 (1993).

"Self-Diagnosing Intelligent Motors: A Key Enabler for Next Generation Manufacturing System," by Fred M. Discenzo et al., pp. 3/1-3/4 (1999).

"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).

"Experience in Using Estelle for the Specification and Verification of a Fieldbus Protocol: FIP," by Barretto et al., Computer Networking, pp. 295-304 (1990).

"Computer Simulation of H1 Field Bus Transmission," by Utsumi et al., Advances in Instrumentation and Control, vol. 46, Part 2, pp. 1815-1827 (1991).

"Progress in Fieldbus Developments for Measuring and Control Application," by A. Schwaier, Sensor and Acuators, pp. 115-119 (1991).

"Ein Emulationssystem zur Leistungsanalyse von Feldbussystemen, Teil 1," by R. Hoyer, pp. 335-336 (1991).

"Simulatore Integrato: Controllo su bus di campo," by Barabino et al., Automazione e Strumentazione, pp. 85-91 (Oct. 1993).

"Ein Modulares, verteiltes Diagnose-Expertensystem für die Fehlerdiagnose in lokalen Netzen," by Jürgen M. Schröder, pp. 557-565 (1990).

"Fault Diagnosis of Fieldbus Systems," by Jürgen Quade, pp. 577-581 (Oct. 1992).

"Ziele und Anwendungen von Feldbussystemen," by T. Pfeifer et al., pp. 549-557 (Oct. 1987).

"Profibus Infrastructure Measures," by Tilo Pfeifer et al., pp. 416-419 (Aug. 1991).

"Simulation the Time Behaviour of Fieldbus Systems," by O. Schnelle, pp. 440-442 (1991).

"Modélisation et simulation d'un bus de terrain: FIP," by Song et al, pp. 5-9 (undated).

"Field Bus Networks for Automation Systems Containing Intelligent Functional Unites," by W. Kriesel et al., pp. 486-489 (1987).

"Field Buses for Process Interconnection with Digital Control Systems," Tecnología, pp. 141-147 (1990).

"Decentralised Systems with Real-Time Field Bus," Netzwerke, Jg. Nr.3 v. 14.3, 4 pages (1990).

"Process Measurement and Analysis," by Liptak et al., Instrument Engineers' Handbook, Third Edition, pp. 528-530, (1995).

"Improving Dynamic Performance of Temperature Sensors With Fuzzy Control Techniques," by Wang Lei et al., pp. 872-873 (1992).

"Microsoft Press Computer Dictionary" 2nd Edition, 1994, Microsoft Press. p. 156.

International Search Report from Application No. PCT/US01/40791 with international filing date of May 22, 2001.

International Search Report from Application No. PCT/US01/40782 with international filing date of May 22, 2001.

International Search Report from Application No. PCT/02/14560 with international filing date of May 8, 2002.

International Search Report from Application No. PCT/US02/14934 with international filing date of May 8, 2002.

"On-Line Tool Condition Monitoring System With Wavelet Fuzzy Neural Network," by Li Xiaoli et al., pp. 271-276 (1997).

"Optimal Design of the Coils of An Electromagnetic Flow Meter," by Michalski, A. et al., IEEE Transactions on Magnetics, vol. 34, Issue 5, Part 1, pp. 2563-2566 (1998).

"Magnetic Fluid Flow Meter for Gases," Popa, N.C., IEEE Transactions on Magnetics, vol. 30, Issue 2, Part 1-2, pp. 936-938 (1993).

"New Approach to A Main Error Estimation for Primary Transducer of Electromagnetic Flow Meter," by Michalski, A., IEEE Instrumentation and Measurement Technology Conference Proceedings, vol. 2, pp. 1093-1097 (1998).

"Additional Information From Flowmeters Via Signal Analysis," by Amadi-Echendu, J.E. et al., IEEE Instrumentation and Measurement Technology Conference Record, vol. 7, pp. 187-193 (1990).

International Search Report from Application No. PCT/US02/06606 with international filing date of Mar. 5, 2002.

International Search Report from Application No. PCT/US02/30465 with international filing date of Sep. 25, 2002.

"What is a weighted moving average?", *DAU STAT Refresher*, http://cne.gmu.edu/modules/dau/stat/mvavgs/wma_bdy.html. (1995).

U.S. Appl. No. 10/675,014, filed Sep. 2003, Longsdorf et al.

U.S. Appl. No. 10/744,809, filed Dec. 2003, Brown et al.

"Statistics Glossary: Time Series Data", by Easton et al., http://www.stats.gla.ac.uk/steps/glossary/time_series.html, Sep. 1997.

"The Indicators Story", Sustainable Seattle, pp. 55-59, 1998.

"Detecting Regimes in Temperature Time Series", by Clemins et al., *Artificial Neural Networks in Engineering, Proceedings*, pp. 727-732, 2001.

"Re: Digital Filter-Moving Average", The Math Forumn, http://mathforum.org/discuss/sci.math/a/t/177212, Sep. 28, 1998.

U.S. Appl. No. 10/893,144, filed Jul. 2004, Brown et al.

"Notification of Transmittal of the International Search Report and the Written Opinion of the International Searching Authority", or the Declaration for PCT/US2004/017300.

"Invitation to Pay Additional Fees" for PCT/US2004/031678.

"Notification of Transmittal of The International Search Report or the Declaration", PCT/US2004/025291.

"Notification of Transmittal of The International Search Report or the Declaration", PCT/US2004/031678.

"Notification of Transmittal of The International Search Report or the Declaration", PCT/US2005/011385.

"Notification of Transmittal of the International Preliminary Report on Patenatability", PCT/US2004/031678.

Samson, Technical Information; HART Communication, Part 4 Communications; 40 pp.

* cited by examiner

RULE SET FOR ROOT CAUSE DIAGNOSTICS

This application claims the benefit and is a Continuation-in-Part of U.S. application Ser. No. 09/972,078, filed Oct. 5, 2001, which is a Continuation-in-Part of U.S. application Ser. No. 09/303,869, filed May 3, 1999, now U.S. Pat. No. 6,397,114, which is a Divisional of U.S. application Ser. No. 08/623,569, filed Mar. 28, 1996, now U.S. Pat. No. 6,017,143 the contents of which are hereby incorporated by reference in their entirety.

BACKGROUND OF THE INVENTION

The present invention relates to industrial process controls and process control loops. More specifically, the invention relates to diagnostics of such loops.

Process control loops are used in process industries to control operation of a process, such as an oil refinery. A transmitter is typically part of the loop and is located in the field to measure and transmit a process variable such as pressure, flow or temperature, for example, to control room equipment. A controller such as a valve controller is also part of the process control loop and controls position of a valve based upon a control signal received over the control loop or generated internally. Other controllers control electric motors or solenoids for example. The control room equipment is also part of the process control loop such that an operator or computer in the control room is capable of monitoring the process based upon process variables received from transmitters in the field and responsively controlling the process by sending control signals to the appropriate control devices. Another process device which may be part of a control loop is a portable communicator which is capable of monitoring and transmitting process signals on the process control loop. Typically, these are used to configure devices which form the loop.

Various techniques have been used to monitor operation of process control loops and to diagnose and identify failures in the loop. However, it would also be desirable to identify the source or "root cause" of a failure, such as by identifying a particular device or component in the system which is the source of an aberration in process operation. This would provide additional information to an operator as to which device in the process needs repair or replacement.

SUMMARY OF THE INVENTION

A reduced rule set for identifying a root cause of an aberration in an industrial process is provided. To generate the reduced rule set, a rule base comprising a plurality of rules for the industrial process is used. Each rule comprises a condition of a plurality of process signals of the industrial process and a fault which corresponds to a condition of the process signals. Available process signals of the industrial process are identified. Rules from the plurality of rules of the rule base are selectively removed to produce the reduced rule set.

DETAILED DESCRIPTION OF THE PREFERRED EMBODIMENTS

Figure 1:
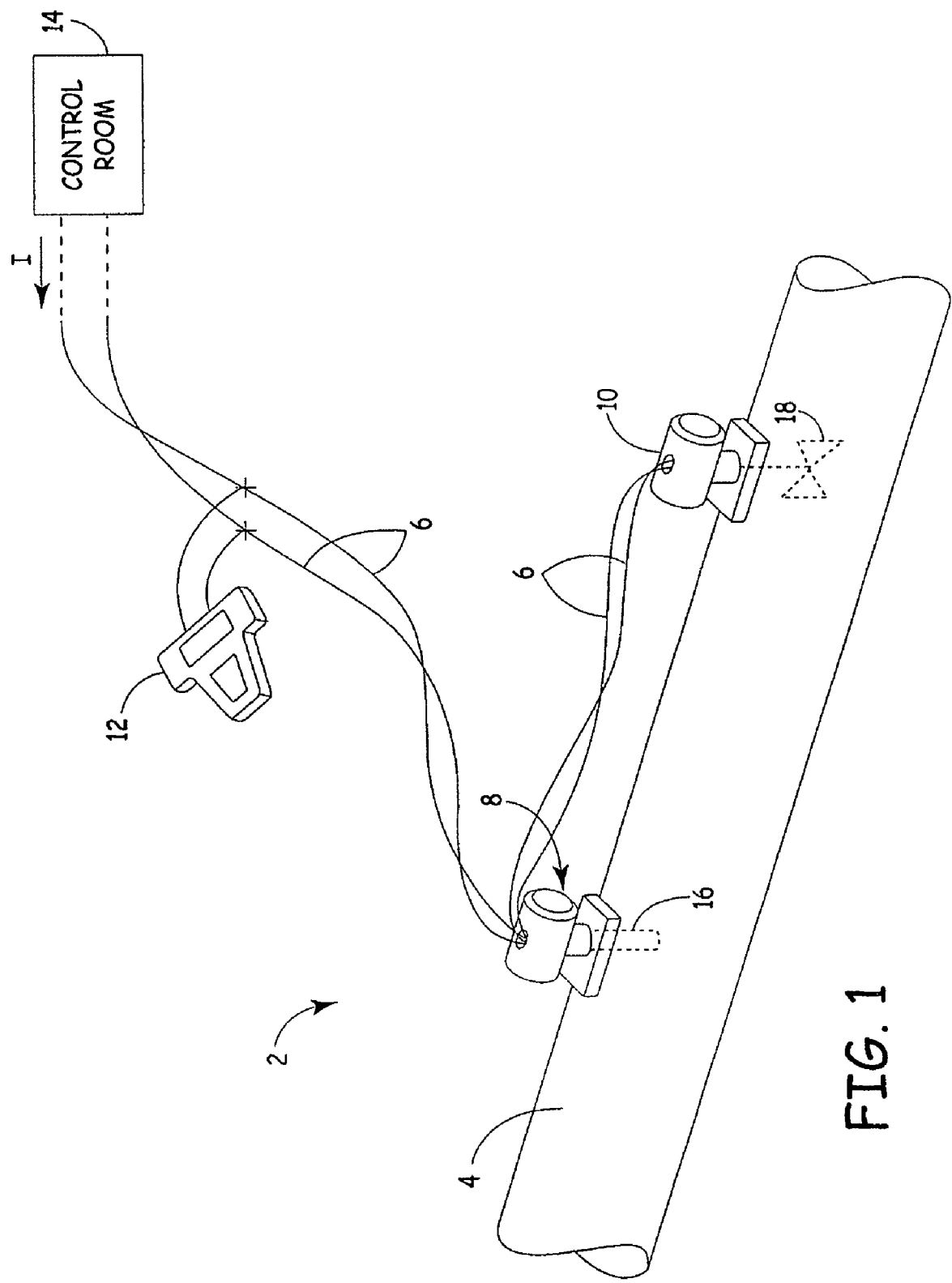
FIG. 1 is a simplified diagram showing a process control loop including a transmitter, controller, hand-held communicator and control room.

The present invention can be used with industrial processes to identify the "root cause" of an aberration which occurs in the process. FIG. 1 is a diagram showing an example of an industrial process control system 2 used to control flow of process fluid system 2 includes process piping 4 which carries a process fluid and two wire process control loop 6 carrying loop current I. A transmitter 8, controller 10, which couples to a final control element in the loop such as an actuator, valve, a pump, motor or solenoid, communicator 12, and control room 14 are all part of process control system 2. If an aberration occurs in the operation of the process, the present invention can be used to identify the cause of the observed aberration.

Loop 6 is shown in one configuration for illustration purposes and any appropriate process control loop may be used such as a 4-20 mA loop, 2, 3 or 4 wire loop, multi-drop loop and a loop operating in accordance with the HART®, Fieldbus or other digital or analog communication protocol. In operation, transmitter 8 senses a process variable such as flow using sensor 16 and transmits the sensed process variable over loop 6. The process variable may be received by controller/valve actuator 10, communicator 12 and/or control room equipment 14. Controller 10 is shown coupled to valve 18 and is capable of controlling the process by adjusting valve 18 thereby changing the flow in pipe 4. Controller 10 receives a control input over loop 6 from, for example, control room 14, transmitter 8 or communicator 12 and responsively adjusts valve 18. In another embodiment, controller 10 internally generates the control signal based upon process signals received over loop 6. Communicator 12 may be the portable communicator shown in FIG. 1 or may be a permanently mounted process unit which monitors the process and performs computations. Process devices include, for example, transmitter 8 (such as a 3095 transmitter available from Rosemount Inc.), controller 10, communicator 12 and control room 14 shown in FIG. 1. Another type of process device is a PC, programmable logic unit (PLC) or other computer coupled to the loop using appropriate I/O circuitry to allow monitoring, managing, and/or transmitting on the loop.

Figure 2:
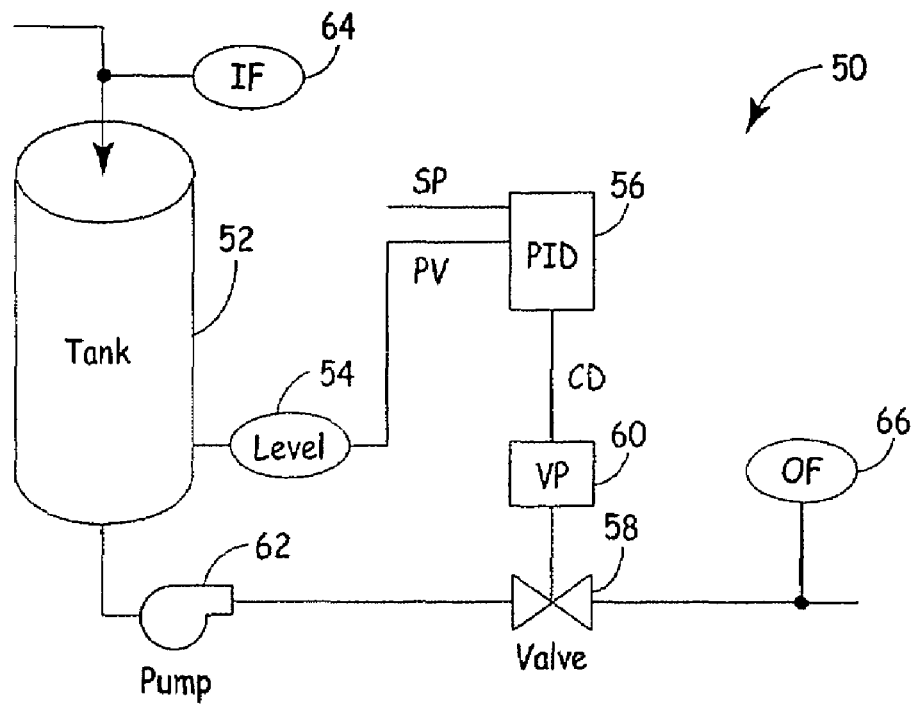
FIG. 2 is a schematic diagram of a process control loop model for a liquid level loop.

FIG. 2 is a simplified diagram 50 of a graphical model of a process control loop 50 for controlling the level of liquid in a tank 52. As discussed below, such models can be selected and used to diagnose a root cause of an aberration in process operation. A level transmitter 54 measures the level of liquid in tank 52 and provides a primary process variable (PV) to a controller 56. Controller 56 as illustrated is a PID controller, however, it can be any type of controller. Controller 56 also receives a setpoint (SP) which is related to a desired level for the liquid within tank 52. Using a known control algorithms, controller 56 provides a control demand (CD) output to a valve 58. An optional valve position sensor 60 can be used to measure the actual position of the valve stem of valve 58. Other optional components for this particular example model include a pump 62 configured to draw liquid from tank 52, a transmitter 64 configured to measure the inlet flow rate and a transmitter 66 configured to measure the outlet flow rate. As described below, the models and optional components for a model are stored in a memory and can be selected by an operator or other selection technique. In various aspects, the memory can be located or accessible to any device which couples to the process or has access to process signals.

It is preferable to perform the diagnostics of the present invention on the process control system after the operation of the process has settled and is in a steady state mode. This is ensured by observing the mean and standard deviation of process signals. The mean ($\mu$) and standard deviation ($\sigma$) of each of the process signals (such as process variables and control signals) are evaluated for a set of N measurements, the mean and standard deviation can be evaluated as follows:

$$\mu = \frac{1}{N}\sum_{i=1}^{N} x_i \quad \text{EQ. 1}$$

$$\sigma = \sqrt{\frac{1}{N-1}\sum_{i=1}^{N}(x_i - \mu)^2} \quad \text{Eq. 2}$$

The number of points, N, depends upon the duration and sampling rates of the signal. In Equations 1 and 2, $X_i$ is the value of a process signal taken at sample number i. Initially, a sampling period of ten minutes can be used with a sampling rate of one sample per second. In one example, the loop is determined to be operating in a steady state mode if the process mean is 100 inH$_2$O (with 1 inH$_2$O standard deviation) and the subsequent process means are between 97 inH$_2$O and 103 inH$_2$O. One patent which is related to determination of process stability prior to initiating diagnostics in U.S. Pat. No. 6,119,047, issued Sep. 12, 2000, which is incorporated herein by reference in its entirety.

Once steady state operation has been reached, it is also desirable to discard data transients or spikes. One technique to identify such data is by successively comparing the signal mean with the signal standard deviation. The difference in the mean between two successive blocks of data ($\mu_1$ and $\mu_2$) should be less than the standard deviation divided by the square root of N, the number of samples. This can be expressed as:

$$\mu_1 - \frac{\sigma_1}{\sqrt{N}} \leq \mu_2 \leq \mu_1 + \frac{\sigma_1}{\sqrt{N}} \quad \text{EQ. 3}$$

where $\mu$ is the mean of the previous block, $\mu_2$ is the mean of the current block, N is the number of points in a block, and $\sigma_1$ is the standard deviation of the previous block.

Depending on the process signals which are available for performing diagnostics and used with the model, different root causes can be identified. For example, in the case of the process model shown in FIG. 2, there are three different cases:

TABLE 1

| Case | Available Signals | Monitored Faults |
|---|---|---|
| 1 | SP<br>PV<br>CD | Level Sensor Drift<br>Valve Problem |
| 2 | SP<br>PV | Level Sensor Drift<br>Valve Problem |

TABLE 1-continued

| Case | Available Signals | Monitored Faults |
|---|---|---|
| 3 | CD<br>VP<br>SP<br>PV<br>CD<br>VP<br>IF<br>OF | Level Sensor Drift<br>Valve Problem<br>Liquid Leak |

During an initial training phase, all of the process signals are collected for a user selectable amount of time, for example, 20 minutes. The mean and standard deviations of the signals are evaluated. This training phase is repeated until the process enters steady state. Once the process is in steady state, trained values (i.e., "nominal values") for the mean ($\mu_t$) and standard deviation ($\sigma_t$) for each of the process signals are stored.

Additionally, prior to identifying a root cause fault, individual process signals can be evaluated to ensure that the process is operating properly. For example, the primary process variable (PV) can be evaluated. In the case of liquid level illustrated in FIG. 2:

TABLE 2

| CONDITION | FAULT |
|---|---|
| PV > 0.95 * PV_RANGE | LEVEL HIGH (TANK OVERFLOW) |
| PV < 0.05 * PV_RANGE | LEVEL LOW (TANK DRY) |

Where PV_RANGE is the range (maximum and minimum) of the level. This value can be stored in a memory accessible by the process control system when the process control system is configured or can be entered by a user. Similarly, for the control signal (CD), the following faults can be identified:

TABLE 3

| CONDITION | FAULT |
|---|---|
| CD < 5% | CONTROL WOUND DOWN |
| CD > 95% | CONTROL WOUND UP |

In the example of Table 3, it is assumed that the control demand is a percentage between 0 and 100. If available, a similar test can be performed on the valve position (VP) process signal.

During a monitoring phase, the various process signals are monitored to determine if they have undergone no change (NC), an upward deviation (U) (the mean signal is above the training mean), or a downward variation (D) (the mean signal is less than a training mean). An NC condition is determined if:

$$\mu_t - \frac{\sigma_t}{\sqrt{N}} \leq \mu \leq \mu_t + \frac{\sigma_t}{\sqrt{N}} \quad \text{EQ. 4}$$

where $\mu_t$ is the mean of the training block, $\mu$ is the mean of the current block, N is the number of points in a block, and $\sigma_t$ is the standard deviation of the training block, $\mu_t$ and $\sigma_t$ are the mean and standard deviation, respectively, of the process signal stored during the training phase. N is the number of samples and μ is the current mean of the process signal.

An upward variation (U) condition is identified if:

$$\mu > \mu_t + \frac{\sigma_t}{\sqrt{N}}$$   EQ. 5 where $\mu_t$ is the mean of the training block, μ is the mean of the current block, N is the number of points in a block, and $\sigma_t$ is the standard deviation of the training block.

Finally, a downward variation (D) condition is identified if:

$$\mu < \mu_t - \frac{\sigma_t}{\sqrt{N}}$$   Eq. 6 where $\mu_t$ is the mean of the training block, μ is the mean of the current block, N is the number of points in a block, and $\sigma_t$ is the standard deviation of the training block.

Depending upon the number of process signals which are available, a different root cause can be identified as the source of an aberration in the process. For example, if the setpoint, primary variable and control demand process signals are available, a level sensor drift or valve related problem can be identified. An example rule base is given in Table 4:

TABLE 4

| SIGNALS | FAULT<br>Level Sensor Drift or Valve Problem |
|---|---|
| SP | NC |
| PV | NC |
| CD | U or D |

If an additional process signal is available, the actual valve position (VP), then the root cause can be more specifically identified as given in Table 5:

TABLE 5

| | FAULT | |
|---|---|---|
| SIGNALS | Level Sensor Drift | Valve Problem |
| SP | NC | NC |
| PV | NC | NC |
| CD | U or D | U or D |
| VP | U or D | NC |

Finally, if the inflow rate (IF) and outflow rate (OF) process signals are available, it is also possible to determine if there is a leak in tank 52 as shown in the rule base of Table 6:

TABLE 6

| | FAULT | | |
|---|---|---|---|
| SIGNALS | Level Sensor Drift | Valve Problem | Liquid Leak |
| SP | NC | NC | NC |
| PV | NC | NC | NC |
| CD | U or D | U or D | D |
| VP | U or D | NC | D |
| IF | NC | NC | NC |
| OF | NC | NC | D |

If the changes in the process signals do not match any of the rules set forth in Tables 4, 5 and 6, an unknown fault output can be provided. Further, these rules apply if the process 50 includes pump 62 or operates based upon a pressure differential which is used to drain tank 52.

Figure 3:
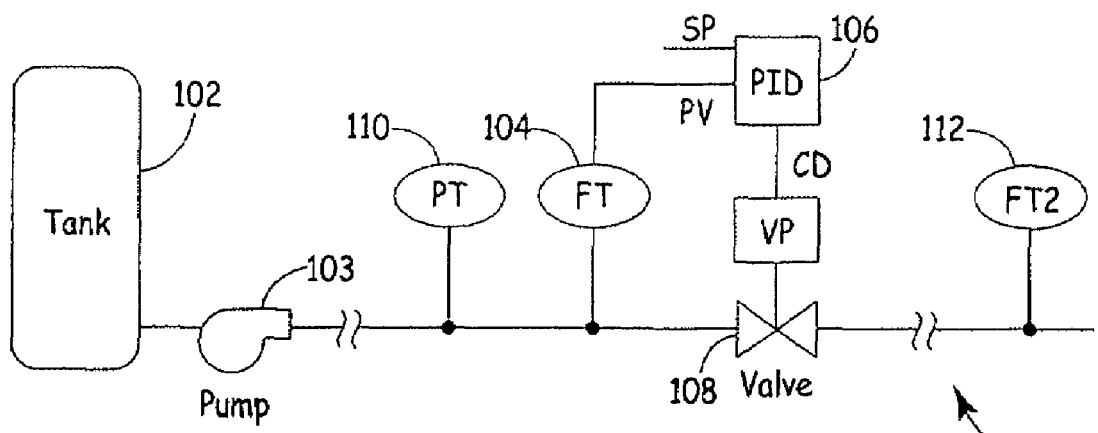
FIG. 3 is a schematic diagram of a process control loop model for a flow rate control loop.

FIG. 3 is a simplified diagram 100 of a graphical model of a process control loop to control a flow rate. This illustrates another example process control loop. In FIG. 3, a tank 102 (or a pump 103 or other source of a differential pressure) can provide a flow of process fluid. A transmitter 104 senses the flow rate and provides the primary process variable (flow rate) to controller 106. Controller 106 also receives a setpoint (SP) and provides a control demand (CD) signal to valve 108. Valve 108 may optionally report back the actual position of its valve stem (VP). Additional options include a pressure transmitter 110 configured to sense a process pressure (PT) and a redundant flow transmitter 112 configured to sense a redundant flow rate (FT2).

In operation, the mean and standard deviation are determined during a training phase in a manner similar to that described with respect to FIG. 2 and as set forth in Equations 1 and 2, above. However, because a flow rate control typically responds relatively fast, a shorter learning duration can be used, for example two minutes.

Depending upon the number of different process signals which are available, a number of different root causes can be identified as illustrated in Table 7:

TABLE 7

| Case | Available Signals | Monitored Faults |
|---|---|---|
| 1 | SP | Flow Sensor |
| | PV | Drift |
| | CD | Valve Problem |
| 2 | SP | Flow Sensor |
| | PV | Drift |
| | CD | Valve Problem |
| | VP | |
| 3 | SP | Flow Sensor |
| | PV | Drift |
| | CD | Valve Problem |
| | VP | Liquid Leak |
| | FT2 | |

Prior to identifying a root cause, basic faults can be checked for. For example, using the rule base in Table 8:

TABLE 8

| CONDITION | FAULT |
|---|---|
| PT is D | HEAD LOSS |

Further, the condition of the valve can be determined as follows:

TABLE 9

| CONDITION | FAULT |
|---|---|
| CD < 5% | CONTROL WOUND DOWN |
| CD > 95% | CD WOUND UP |

Using additional process variables, a "root cause" of an aberration in the process can be identified. When the setpoint, primary process variable and control demand signals are available flow sensor drift or a valve problem can be identified as the root cause of the process aberration as follows:

TABLE 10

| SIGNALS | FAULT Flow Sensor Drift or Valve Problem |
|---|---|
| SP | NC |
| PV | NC |
| CD | U or D |

If an additional process signal is available, the actual valve position (VP), then the root cause can be identified as flow sensor drift or a valve problem as follows:

TABLE 11

| | FAULT | |
|---|---|---|
| SIGNALS | Flow Sensor Drift | Valve Problem |
| SP | NC | NC |
| PV | NC | NC |
| CD | U or D | U or D |
| VP | U or D | NC |

Finally, if a redundant transmitter is used to measure a second flow rate variable (FT2), then a leak in the process can also be identified:

TABLE 12

| | FAULT | | |
|---|---|---|---|
| SIGNALS | Level Sensor Drift | Valve Problem | Liquid Leak |
| SP | NC | NC | NC |
| PV | NC | NC | NC |
| CD | U or D | U or D | D |
| VP | U or D | NC | D |
| FT2 SIGNALS | U or D | NC | D |

Figure 4:
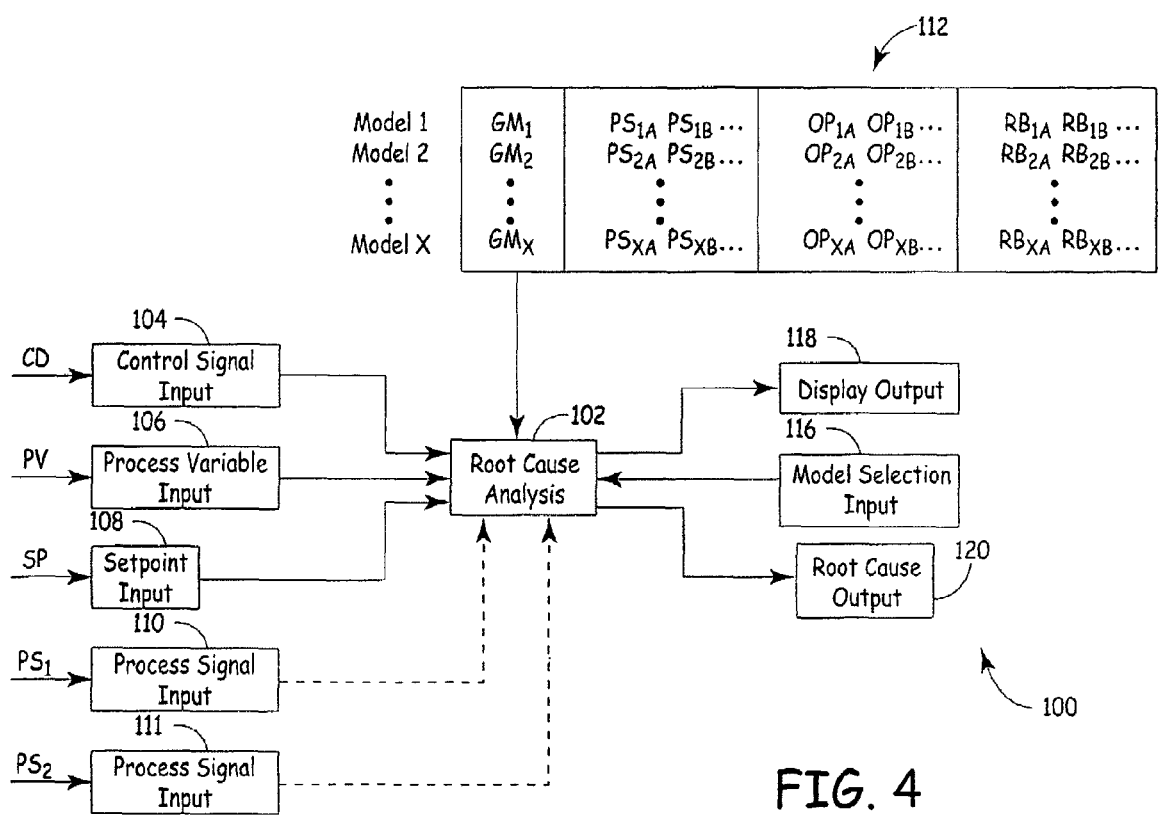
FIG. 4 is a block diagram of a device for implementing one example of the present invention.

FIG. 4 is a block diagram illustrating a process device 100 which implements one example embodiment of the present invention. Process device 100 includes a root cause analysis block 102 which receives a control signal CD through a control signal input 104, a process variable PV through a process variable input 106 and a setpoint SP through a setpoint input 108. Additional process signals ($PS_1$, $PS_2$ ...) can be received through other inputs such as process signal input 110, 111, etc. depending on the number of additional process signals which are available.

The root cause analysis block 102 is also coupled to a plurality of process configuration models 112. Models 112 can be stored, for example, in a system memory. In the embodiment illustrated, there are a total of X different models which correspond to possible process control configurations. In this example, each model includes a graphical model $GM_1$ ... $GM_x$ which provide graphical illustrations of the process. This can be used to provide a graphical user interface to facilitate entry of configuration data by an operator. For example, a graphical model can be similar to the diagrams shown in FIGS. 2 and 3.

Each process model can receive any number of process signals ($PS_{1A}$, $PS_{1B}$, etc.). In the specific examples shown in FIGS. 2 and 3, there are a minimum of three process signals, the control demand CD, the primary process variable PV and the setpoint SP which are required to identify the root cause of an aberration in the process. In one embodiment, the number of process signals associated with a model is the minimum number of process signals required to perform the root cause analysis, or a greater number of process signals, as desired.

Next, each model can contain any number of optional process signals ($OP_{1A}$, $OP_{1B}$, ... ). Each optional process signal corresponds to a process signal ($PS_1$, $PS_2$, ...) received through inputs 110, 111, etc. In the example of FIG. 2, the valve position VP, inflow rate IF and outflow rate OF are examples of such optional process signals. Some models can be configured which have no additional optional process signals.

Next, each model contains any number of rule bases ($RB_{1A}$, $RB_{1B}$, ... ) which are used to determine the root cause based upon the received process signals (the require minimum process signals $PS_{1A}$, $PS_{1B}$, ... and any optional process signals $OP_{1A}$, $OP_{1B}$ ... ). Examples of rule bases are shown in Tables 4, 5, 6, 10, 11 and 12 which were discussed above. Note that the present invention is not limited to the particular use of the rule bases illustrated above to perform the root cause analysis. In one aspect, any analysis technique can be used including neural networks, other rules bases, regressive learning, fuzzy logic, and other known diagnostic techniques or techniques yet to be discovered. With the examples given here, there are a minimum of three process signals which are received, the control demand CD signal, the primary process variable PV signal and the setpoint SP signal. However, other process signals, fewer signals, or different signal combinations can be used to perform the root cause analysis.

Root cause analysis block 102 receives a model selection input 116 which is used to select one of the plurality of models 112. The model selection input can be from an operator or from another source. The model selection input 116 identifies one of the plurality of models 112 for subsequent use by root cause analysis block 102. Additionally, in one example, additional optional process (OP) signals can be selected for use with the selected model. If a graphical user interface is used, the models can include graphical models which can be displayed on a display output 118 and used in configuring the model. For example, the particular process signal can be assigned using the model selection input 116 to one of the process signals ($PS_{1A}$, $PS_{1B}$ ... ) or optional process signals ($OP_{1A}$, $OP_{1B}$ ... ) associated with a selected model. This assignment can be illustrated in a graphical form.

Once a model has been selected, the process signals used by the model rule base are assigned to the actual process signals received from the process. The root cause analysis block 102 can perform a root cause analysis using any desired technique such as those set forth above. Based upon the root cause analysis, a root cause output 120 is provided which is an indication of the root cause of an aberration of an event which has occurred in the process.

Figure 5:
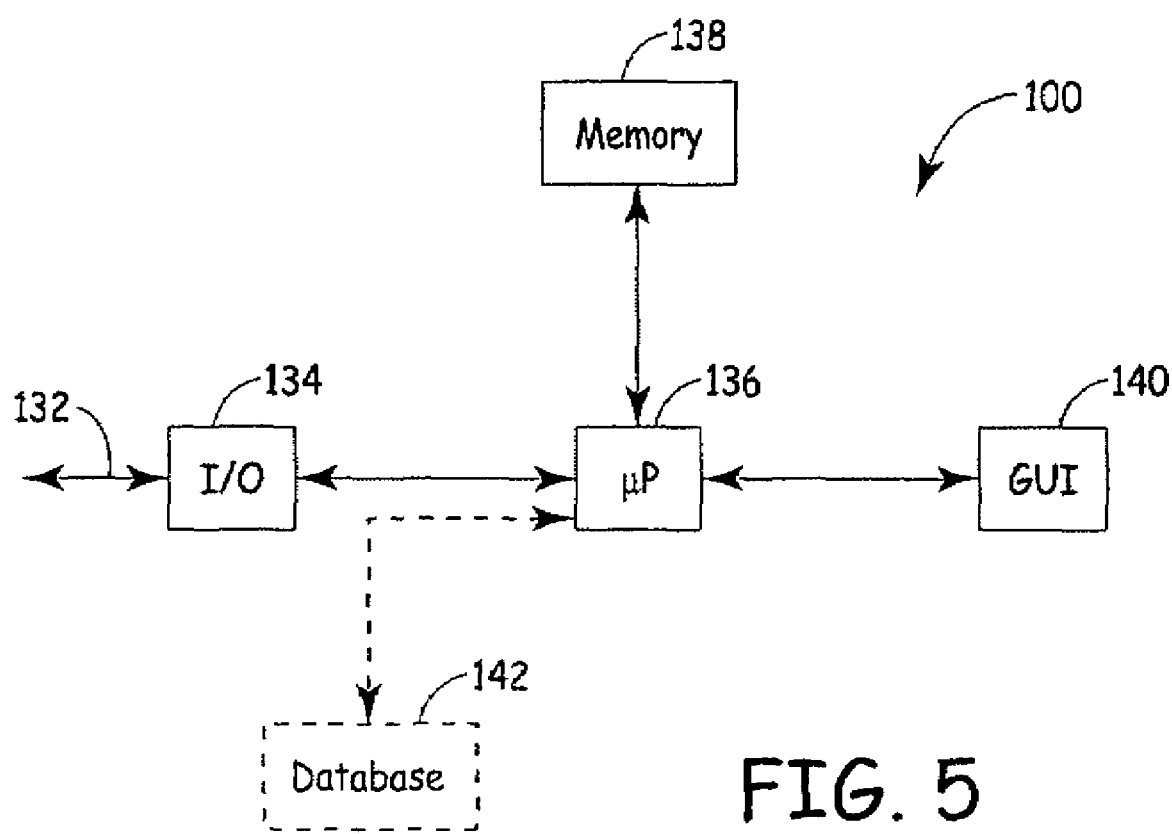
FIG. 5 is a block diagram showing one example hardware implementation of FIG. 4.

Pursuant to one embodiment of the invention, FIG. 5 is a simplified block diagram showing one physical implementation of process device 100. In the example of FIG. 5, device 100 couples to a process control loop 132 through input/output 134. Loop 132 can be, for example, the two wire loop shown in. FIG. 1 or other process control loop. Further, the connection does not need to be a direct connection and can simply be a logical connection in which variables from the loop are received through a logical input/output block 134. A microprocessor 136 couples to a memory 138 and a graphical user interface 140. The memory 138 can be used to store variables and programming instructions, as well as models 112 shown in FIG. 4.

The graphical user interface 140 provides an input for receiving the model selection input 116 as well as the display output 118 of FIG. 4 for use during model selection and configuration. Microprocessor 136 can also couple to an optional database 142 which can contain information related to the configuration and operation of the process being monitored. For example, many process control or monitoring systems contain such databases. One example is AMS Suite: Intelligent Device Manager available from Emerson Process Management of Eden Prairie, Minn.

It is appreciated that the root cause process device 100 can be implemented in any process device such as transmitters, controllers, hand-held communicators, or the control room computer shown in FIG. 1. In one embodiment, process device 100 will operate on a computer system or PC located in the control room or other remote location. Process control loop 132 will typically comprise some type of a Fieldbus based loop, or multiple control loops. In such a configuration, process device 100 can poll the desired process signals the various devices coupled to the control loop for the selected model. Although a graphical user interface 140 is shown, the model can be selected using any selection technique and does not need to be selected and configured by a human operator. For example, based upon configuration information stored in another location were provided through other techniques, the appropriate rule base and any model options can be received by device 100. Alternatively, the root cause process device 100 can be implemented in the field and reside in the transmitter for example.

As discussed above, one technique for identifying a root cause of an aberration in the process is by applying rules to process signals of the industrial process. This allows faults to be detected based upon measured process variables. For example, for a process control loop in which a large number of measurements are available, a large number of different types of faults can be detected. Conversely, in a similar process control loop in which fewer measurements are made, some fault conditions may not be recognized. Thus, for each loop, there are both required measurements and optional measurements.

When configuring a rule base to run for a particular process control loop, it is necessary to define which faults are detected and how they depend upon the process variables which are available. If some of the measurements are optional, multiple cases must be defined. For example, for a loop with two optional measurements, there could be up to four different cases which must be defined, because each of the two optional process variables may or may not be available in particular instances. Similarly, with three optional measurements there are up to eight cases which must be defined, and with four optional measurements there are sixteen different cases. Thus, as the number of optional measurements increases, the number of different cases which must be defined increases exponentially.

However, in many instances, each of the different possible cases which can be defined for a particular rule base may not have a significant meaning. In some applications, it may be possible to define less than the full number of possible cases. However, this still requires manually defining multiple cases based upon which measurements are available. This introduces additional human error into the process of defining a rule base. It is also difficult to maintain, and a change in one part of the rule base may require other changes in other parts of the rule base. The complexity of defining a rule base increases greatly for complex loops such as a temperature-to-flow cascade loop. The problems can be even further exacerbated if a user enters customized rules into the rule base.

In one aspect, the present invention provides a method and apparatus for creating a reduced rule set based upon which process variables are available for application to the rule set. This provides a system for automatically determining which faults can be detected when only a subset of the possible measurements are available. Further, if a subset of measurements yield two rules to detect two different faults which have identical conditions (or signatures), this ambiguity is automatically determined and can be shown to an operator during the configuration of the loop.

In order to define a rule base, measurements, process signals, faults and individual rules must be defined. As discussed above, process signals are process variables, control signals, etc. Some process signals are required for a particular rule while others are optional. Faults are the various different faults that can be detected based upon these process signals. Rules define a specific condition (signature) or conditions (signatures) of the process signals which, when met, identify a particular fault or faults in the industrial process. There may be more than one rule corresponding to a fault.

Each rule must specify a value or other characteristic describing the state or condition of one or more process signals. Example states include a process signal being greater than a constant, less than a constant, trending upwards, trending downwards, no change, or irrelevant (i.e., blank) in which any condition for this particular process signal will satisfy the rule.

Figure 6:
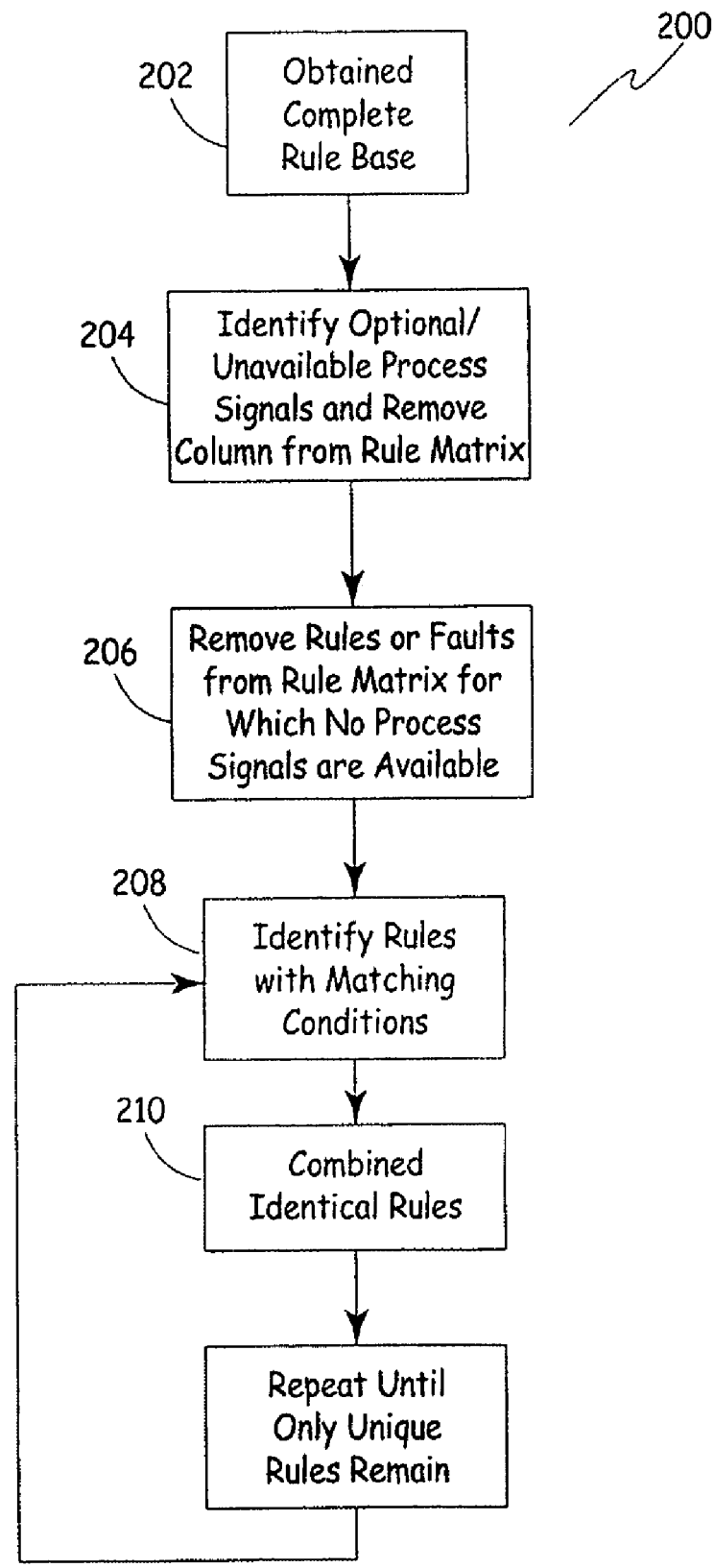
FIG. 6 is a simplified block diagram showing steps in accordance with the present invention for generating a reduced rule set.

FIG. 6 is a simplified block diagram 200 showing steps in accordance with the present invention for determining a reduced rule base if only a subset of possible process signals are available. At block 202, a complete rule base is obtained based upon all possible process signals for a particular process.

For each optional process signal that is not available for the particular industrial process, that column is removed from the rule matrix as set forth at 204 in FIG. 6. Any rules or faults which no longer have any non-blank process signals are removed from the matrix at block 206, which produces a reduced rule set. Next at block 208, the remaining rules are examined to identify matching conditions (signatures). Any remaining rules which have identical conditions are combined into a single rule at block 210. If a combined rule has different faults, the faults are combined together to create a new fault if the new combined fault does not already exist. Steps 208-210 are repeated until only unique rules are remaining in the reduced rule matrix.

The following provides an example of the present invention for a level measurement loop in which the level is driven by a pump. In this example, only the process signals Set Point (SP), Process Variable (PV), Control Demand (CD), and In-Flow Rate (IF) are available. At step 202, a complete rule base is obtained:

TABLE 13

Level Loop Driven by Pump

| Faults | Rules | SP | PV | CD | VP* | IF* | OF* | PT* |
|---|---|---|---|---|---|---|---|---|
| Level High | R1 | | >HI_LIM | | | | | |
| Level Low | R2 | | <LO_LIM | | | | | |
| Control Wound Up | R3 | | | >95% | >95% | | | |
| Control Wound Down | R4 | | | <5% | <5% | | | |
| Head Loss | R5 | | | | | | | D |
| Measurement | R6 | NC | NC | U | U | NC | NC | |
| Drift | R7 | NC | NC | D | D | NC | NC | |
| Valve | R8 | NC | NC | U | NC | NC | NC | |

TABLE 13-continued

Level Loop Driven by Pump

| Faults | Rules | SP | PV | CD | VP* | IF* | Process Signals OF* | PT* |
|---|---|---|---|---|---|---|---|---|
| Problem | R9 | NC | NC | D | NC | NC | NC | |
| Liquid Leak | R10 | NC | NC | D | D | NC | D | |

*Denotes an Optional Process Variable

At step 204, any optional process signals which are not available are removed from the rule matrix. For this example, Valve Position (VP), Outflow Rate (bF), and Process Pressure (PT) are not available. This yields a reduced rule set according to table 14:

TABLE 14

VP, OF and PT Removed

| Faults | Rules | SP | PV | CD | IF* |
|---|---|---|---|---|---|
| Level High | R1 | | >HI_LIM | | |
| Level Low | R2 | | <LO_LIM | | |
| Control Wound Up | R3 | | | >95% | |
| Control Wound Down | R4 | | | <5% | |
| Head Loss | R5 | | | | |
| Measurement Drift | R6 | NC | NC | U | NC |
| | R7 | NC | NC | D | NC |
| Valve Problem | R8 | NC | NC | U | NC |
| | R9 | NC | NC | D | NC |
| Liquid Leak | R10 | NC | NC | D | NC |

Next, at step 206 any rules/faults that have only blank process signals are removed from the matrix. In this example, the fault "Head Loss (HL)" corresponding to rule $R_5$ has only blank process signals. Therefore, this rule can be removed from the matrix:

TABLE 15

Head Loss fault removed

| Faults | Rules | SP | PV | CD | IF* |
|---|---|---|---|---|---|
| Level High | R1 | | >HI_LIM | | |
| Level Low | R2 | | <LO_LIM | | |
| Control Wound Up | R3 | | | >95% | |
| Control Wound Down | R4 | | | <5% | |
| Measurement Drift | R6 | NC | NC | U | NC |
| | R7 | NC | NC | D | NC |
| Valve Problem | R8 | NC | NC | U | NC |
| | R9 | NC | NC | D | NC |
| Liquid Leak | R10 | NC | NC | D | NC |

Next, at step 208, the remaining rules are examined for matching patterns. In this example, rules R6 and R8 have the same pattern and rules R7 and R9 and R10 have the same pattern. At step 210, these identical patterns are combined into a single rule and a new fault is created which is a combination of the faults from the combined rules. In this example, rule R6 is retained and a new fault "measurement drift (MD)/valve problem (VP)" is created. Similarly, rule R7 is retained and a new fault "Measurement Drift/Valve Problem/Liquid Leak" is defined. The final reduced rule base is as follows:

TABLE 16

Final Reduced Rule Base

| Faults | Rules | SP | PV | CD | IF* |
|---|---|---|---|---|---|
| Level High | R1 | | >HI_LIM | | |
| Level Low | R2 | | <LO_LIM | | |
| Control Wound Up | R3 | | | >95% | |
| Control Wound Down | R4 | | | <5% | |
| Measurement Drift/Valve Problem | R6 | NC | NC | U | NC |
| Measurement Drift/Valve problem/Liquid Leak | R7 | NC | NC | D | NC |

The above example is for a relatively simple process control loop with a correspondingly simple rule base. However, when the method is automated, it can be applied to any rule base, including more complicated rule bases, such as a temperature-to-flow cascade loop.

For example, for a generic rule base, the following nomenclature can be used to represent the process signals, rules and faults:

Required Process Signals:=$\{M_{R,1}, M_{R,2}, \ldots M_{R,Nmr}\}$,
Where Nmr is the number of Required Process Signals Optional Process Signals:=$\{M_{O,1}, M_{O,2}, \ldots M_{O,Nmo}\}$,
Where Nmo is the number of Optional Process Signals Faults:=$\{F_1, F_2, \ldots F_{Nf}\}$, where Nf is the number of Faults.

Rules:=$\{R_1, R_2, \ldots R_{Nr}\}$, where Nr is the number of Rules.

$V_{R,a,b}$ is the condition or state for process signal $M_{R,b}$ needed to satisfy rule $R_a$.

$V_{O,a,b}$ is the condition or state for process signal $M_{O,b}$ needed to satisfy rule $R_a$. EQ. 7

With such definition, a complete rule base is as follows:

TABLE 17

Generic RCD Rule Table

| Fault | Rule | $M_{R,1}$ | ... | $M_{R,Nmr}$ | $M_{o,1}$ | $M_{o,2}$ | ... | $M_{o,Nmo}$ |
|---|---|---|---|---|---|---|---|---|
| $F_1$ | R1 | $V_{R,1,1}$ | ... | $V_{R,1,Nmr}$ | $V_{o,1,1}$ | $V_{o,1,2}$ | ... | $V_{o,1,Nmo}$ |
| | R2 | $V_{R,2,1}$ | ... | $V_{R,2,Nmr}$ | $V_{o,2,1}$ | $V_{o,2,2}$ | ... | $V_{o,2,Nmo}$ |
| $F_2$ | R3 | $V_{R,3,1}$ | ... | $V_{R,3,Nmr}$ | $V_{o,3,1}$ | $V_{o,3,2}$ | ... | $V_{o,3,Nmo}$ |

TABLE 17-continued

Generic RCD Rule Table

| Fault | Rule | $M_{R,1}$ | ... | $M_{R,Nmr}$ | $M_{o,1}$ | $M_{o,2}$ | Process Signals ... | $M_{o,Nmo}$ |
|---|---|---|---|---|---|---|---|---|
| | R4 | $V_{R,4,1}$ | ... | $V_{R,4,Nmr}$ | $V_{o,4,1}$ | $V_{o,4,2}$ | ... | $V_{o,4,Nmo}$ |
| | R5 | $V_{R,5,1}$ | ... | $V_{R,5,Nmr}$ | $V_{o,5,1}$ | $V_{o,5,2}$ | ... | $V_{o,5,Nmo}$ |
| $F_3$ | R6 | $V_{R,6,1}$ | ... | $V_{R,6,Nmr}$ | $V_{o,6,1}$ | $V_{o,6,2}$ | ... | $V_{o,6,Nmo}$ |
| $F_4$ | R7 | $V_{R,7,1}$ | ... | $V_{R,7,Nmr}$ | $V_{o,7,1}$ | $V_{o,7,2}$ | ... | $V_{o,7,Nmo}$ |
| ... | ... | ... | ... | ... | ... | ... | ... | ... |
| $F_{Nf}$ | $R_{Nr}$ | $V_{R,Nr,1}$ | ... | $V_{R,Nr,Nmr}$ | $V_{o,Nr,1}$ | $V_{o,Nr,2}$ | ... | $V_{o,Nr,Nmo}$ |

At step 204, all optional process signals that are not available are removed from the table. In a generic configuration, the optional process signals that are not available can be identified as $M_{ona,1}, M_{ona,2}, \ldots$. Optional process signals that are available can be identified as $M_{oa,1}, M_{oa,2}, \ldots, M_{oa,Nmoa}$, with Nmoa<=Nmo. The resulting rule table is:

TABLE 18

Generic RCD Rule Table with Unavailable Process Signals Removed

| Fault | Rule | $M_{R,1}$ | ... | $M_{R,Nmr}$ | $M_{oa,1}$ | $M_{oa,2}$ | Process Signals ... | $M_{oa,Nmoa}$ |
|---|---|---|---|---|---|---|---|---|
| $F_1$ | R1 | $V_{R,1,1}$ | ... | $V_{R,1,Nmr}$ | $V_{oa,1,1}$ | $V_{oa,1,2}$ | ... | $V_{oa,1,Nmoa}$ |
| | R2 | $V_{R,2,1}$ | ... | $V_{R,2,Nmr}$ | $V_{oa,2,1}$ | $V_{oa,2,2}$ | ... | $V_{oa,2,Nmoa}$ |
| $F_2$ | R3 | $V_{R,3,1}$ | ... | $V_{R,3,Nmr}$ | $V_{oa,3,1}$ | $V_{oa,3,2}$ | ... | $V_{oa,3,Nmoa}$ |
| | R4 | $V_{R,4,1}$ | ... | $V_{R,4,Nmr}$ | $V_{oa,4,1}$ | $V_{oa,4,2}$ | ... | $V_{oa,4,Nmoa}$ |
| | R5 | $V_{R,5,1}$ | ... | $V_{R,5,Nmr}$ | $V_{oa,5,1}$ | $V_{oa,5,2}$ | ... | $V_{oa,5,Nmoa}$ |
| $F_3$ | R6 | $V_{R,6,1}$ | ... | $V_{R,6,Nmr}$ | $V_{oa,6,1}$ | $V_{oa,6,2}$ | ... | $V_{oa,6,Nmoa}$ |
| $F_4$ | R7 | $V_{R,7,1}$ | ... | $V_{R,7,Nmr}$ | $V_{oa,7,1}$ | $V_{oa,7,2}$ | ... | $V_{oa,7,Nmoa}$ |
| ... | ... | ... | ... | ... | ... | ... | ... | ... |
| $F_{Nf}$ | $R_{Nr}$ | $V_{R,Nr,1}$ | ... | $V_{R,Nr,Nmr}$ | $V_{oa,Nr,1}$ | $V_{oa,Nr,2}$ | ... | $V_{oa,Nr,Nmoa}$ |

At step 206, after the unavailable process signals have been removed, there may be some rules $R_n$ for which all of the measurement conditions $V_{r,n,i}$ (1<=i<=Nmr) and $V_{Oa,n,j}$ (1<=j<=Nmoa) are blank. These rules can be removed the rule table. If any faults have had all of their rules removed from the rule table, then these faults should also be removed from the rule table. Assuming for this example that $F_3$ has been completely removed from the rule table and $R_4$ and $R_5$ corresponding to $F_2$ have been removed from the rule table, the rules $R_4$, $R_5$ and $R_6$ were completely dependent upon the optional measurements that are not available. The resulting rule table is as follows:

TABLE 19

Generic RCD Rule Table with Non-detectable faults removed

| Fault | Rule | $M_{R,1}$ | ... | $M_{R,Nmr}$ | $M_{oa,1}$ | $M_{oa,2}$ | Process Signals ... | $M_{oa,Nmoa}$ |
|---|---|---|---|---|---|---|---|---|
| $F_1$ | R1 | $V_{R,1,1}$ | ... | $V_{R,1,Nmr}$ | $V_{oa,1,1}$ | $V_{oa,1,2}$ | ... | $V_{oa,1,Nmoa}$ |
| | R2 | $V_{R,2,1}$ | ... | $V_{R,2,Nmr}$ | $V_{oa,2,1}$ | $V_{oa,2,2}$ | ... | $V_{oa,2,Nmoa}$ |
| $F_2$ | R3 | $V_{R,3,1}$ | ... | $V_{R,3,Nmr}$ | $V_{oa,3,1}$ | $V_{oa,3,2}$ | ... | $V_{oa,3,Nmoa}$ |
| $F_4$ | R7 | $V_{R,7,1}$ | ... | $V_{R,7,Nmr}$ | $V_{oa,7,1}$ | $V_{oa,7,2}$ | ... | $V_{oa,7,Nmoa}$ |
| ... | ... | ... | ... | ... | ... | ... | ... | ... |
| $F_{Nf}$ | $R_{Nr}$ | $V_{R,Nr,1}$ | ... | $V_{R,Nr,Nmr}$ | $V_{oa,Nr,1}$ | $V_{oa,Nr,2}$ | ... | $V_{oa,Nr,Nmoa}$ |

Next, at step 208, any rules having identical signatures are identified and combined at step 210. For example, the following pseudo-computer code can be used:

```
For i=1 to Nr
    For j=i+1 to Nr
        Rule1 = R_i
        Rule 2 = R_j
        RulesSame = True
        For k=1 to Nmr
            If V_{R,i,k} != V_{R,j,k} then RulesSame=False
        Next
        For k=1 to Nmoa
            If V_{oa,i,k} != V_{oa,j,k} then RulesSame=False
        Next
        If RulesSame = True then CombineRules (Rule1,Rule2)
    Next
Next
Sub CombineRules (Rule1, Rule2)
    FaultName = [Rule1 Fault] & [Rule 2 Fault]
    If (FaultName Exists) then
        Add Rule1 to FaultName
    Else
        Create New Fault (FaultName)
        Add Rule1 to FaultName
    EndIf
End Sub
```

Figure 7:
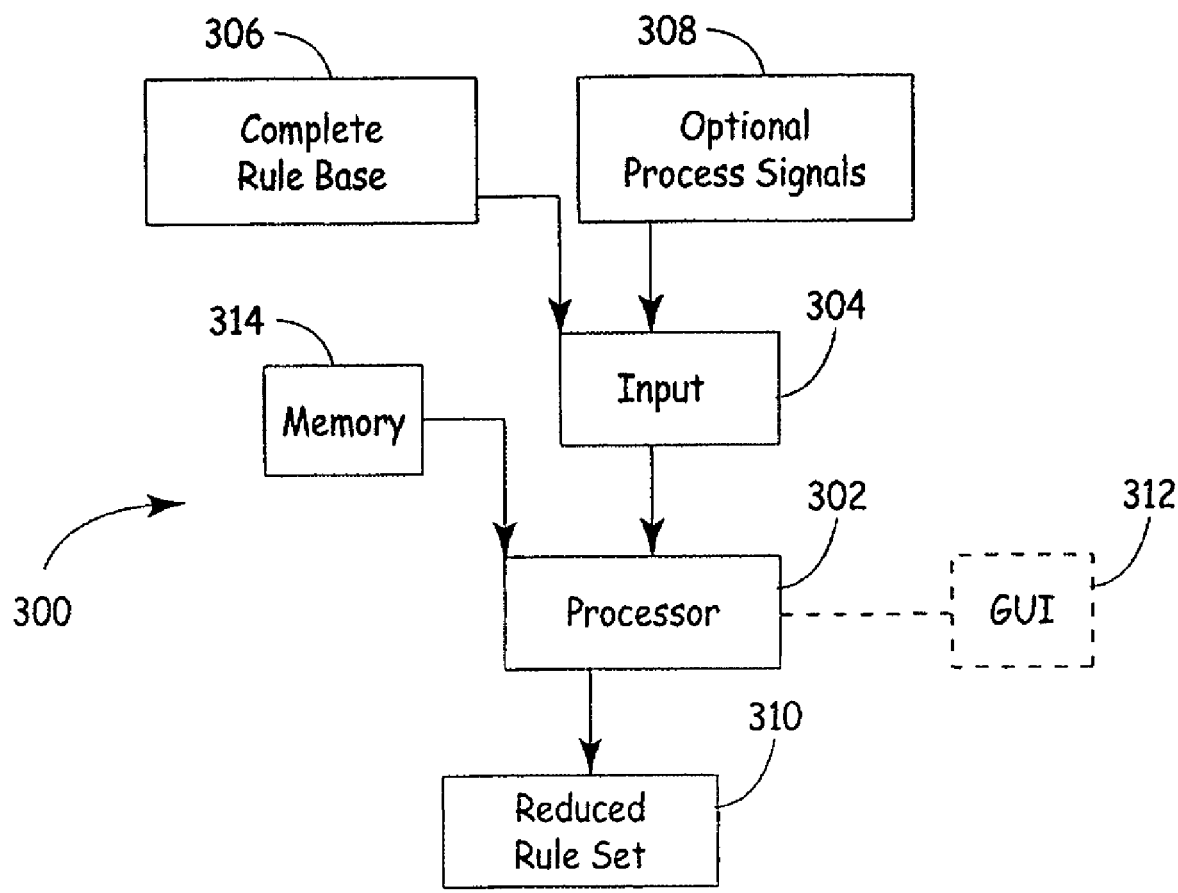
FIG. 7 is a block diagram showing an automated system for performing the steps of FIG. 6.

The steps in method of the present invention can be implemented in a computer based system such as that illustrated in FIG. 7. In FIG. 7, computer system 300 includes a processor 302 configured to receive an input 304. The input 304 can be any appropriate input including manual input, electrical inputs such as through a databus, or an input comprising a data received from a memory or other storage device. The input receives a complete rule base 306 along with an identification of optional process signals 308. Processor 302 performs the steps illustrated in FIG. 6 and as discussed above. Based on these steps, a reduced rule set 310 is provided as an output. The reduced rule set 310 can be in any appropriate form including human readable or machine readable form and can be provided on any appropriate output including an output to another computer, a memory, a databus, etc. FIG. 7 also illustrates an optional user interface identified as a graphical user interface 312. Through user interface (GUI) 312, an operator can control operation of processor 302 and receive information from processor 302 related to the application of steps set forth in FIG. 6 and other information. A memory 314 is provided for, for example, storing program instructions in accordance with the steps of the present invention. Memory 314 can be any type of storage medium. In one configuration, memory 314 comprises a permanent memory such as a disk or the like or a temporary memory, including a memory coupled to a databus or network, stores the program instructions to carry out the steps set forth in FIG. 6. These program instructions are provided to processor 302 from memory 314 so that processor 302 implements these steps.

As used herein, process variables are typically the primary variables which are being controlled in a process. As used herein, process variable means any variable which describes the condition of the process such as, for example, pressure, flow, temperature, product level, pH, turbidity, vibration, position, motor current, any other characteristic of the process, etc. Control signal means any signal (other than a process variable) which is used to control the process. For example, control signal means a desired process variable value (i.e. a setpoint) such as a desired temperature, pressure, flow, product level, pH or turbidity, etc., which is adjusted by a controller or used to control the process. Additionally, a control signal means, calibration values, alarms, alarm conditions, the signal which is provided to a control element such as a valve position signal which is provided to a valve actuator, an energy level which is provided to a heating element, a solenoid on/off signal, etc., or any other signal which relates to control of the process. A diagnostic signal as used herein includes information related to operation of devices and elements in the process control loop, but does not include process variables or control signals. For example, diagnostic signals include valve stem position, applied torque or force, actuator pressure, pressure of a pressurized gas used to actuate a valve, electrical voltage, current, power, resistance, capacitance, inductance, device temperature, stiction, friction, full on and off positions, travel, frequency, amplitude, spectrum and spectral components, stiffness, electric or magnetic field strength, duration, intensity, motion, electric motor back emf, motor current, loop related parameters (such as control loop resistance, voltage, or current), or any other parameter which may be detected or measured in the system. Furthermore, process signal means any signal which is related to the process or element in the process such as, for example, a process variable, a control signal or a diagnostic signal. Process devices include any device which forms part of or couples to a process control loop and is used in the control or monitoring of a process.

Although the present invention has been described with reference to preferred embodiments, workers skilled in the art will recognize that changes may be made in form and detail without departing from the spirit and scope of the invention. Although two example processes and example models are. shown in this description, the invention is applicable to other process configurations and models can be generated using known techniques or techniques discovered in the future. Further, other types of rule bases or model configurations can be used with the present invention. The invention can be implemented in a stand-alone device or can be a software module which is added to software used to control or monitor industrial processes. In one aspect, the invention includes the computer instructions and/or storage media used to implement the invention. As used herein, a "process model" is any logical representation of a process and is not limited to the specific examples set forth herein. A "root cause" is the initial cause (or causes) of a variation or aberration in process operation. Other types of process control loops which can be modeled include, but are not limited to, flow control, level control, temperature control, etc., including regulator control and cascade control of gases, liquids, solids or other forms of process material. Specific examples of loops include a flow control loop with valve driven by differential pressure, a level control loop with valve driven by differential pressure, temperature regulatory control to flow regulatory control, level regulatory control to valve pump driven, flow control with valve driven by pump, level regulatory control to valve chiller condenser, level regulatory control to flow regulatory control cascade feed, liquid temperature regulatory control to valve, liquid temperature regulatory control to flow regulatory control, gas flow control with valve driven by differential pressure, gas temperature regulatory control to valve, gas pressure regulatory control to valve, gas pressure regulatory control to flow regulatory control, level regulatory control to flow regulatory control cascade reboiler, liquid pressure regulatory control to valve and level regulatory control to valve reboiler, for example. Various types of process elements which can be controlled include drums and tanks, heat exchangers, towers, steam systems, condensers, boilers, reactors, and heaters, compressors, fuel systems, turbines and flare systems, for example.

What is claimed is:

1. A method for generating a reduced rule set for identifying a root cause of an aberration in an industrial process for use in an industrial process field device, comprising:
   (a) obtaining a rule base comprising a plurality of rules for the industrial process, each rule comprising a condition of at least one process signal of the industrial process and a fault which corresponds to a condition of at least one process signal;
   (b) identifying which process signals of the industrial process are available to the field device;
   (c) selectively removing a rule from the plurality of rules of the rule base to produce the reduced rule set, wherein the step of selectively removing a rule is based upon the step of identifying which process signals of the industrial are available; and
   (d) storing the reduced rule set in a memory of the field device;
   (e) performing diagnostics in the field device based upon the reduced rule set and the identification process signals.

2. The method of claim 1 including identifying rules within the reduced rule set having identical process signal conditions.

3. The method of claim 2 including combining rules in the reduced rule set which have identical process signal conditions.

4. The method of claim 3 including creating a new fault for a combined rule.

5. The method of claim 1 wherein the process signals comprise process variables.

6. The method of claim 1 including automating steps (a) through (c).

7. The method of claim 6 and including performing (a) through (c) in a computer.

8. The method of claim 3 including repeating the step of combining until only unique rules are left in the reduced rule set.

9. The method of claim 1 wherein the condition of at least one of the process signals comprises the group of conditions consisting of less than a constant, greater than a constant, trending up, trending down, no change and blank.

10. A computer system configured to implement the method of claim 1.

11. An apparatus for determining a reduced rule set for identifying a root cause of an aberration in an industrial process for use in an industrial process field device, comprising:
   means for obtaining a rule base comprising a plurality of rules for the industrial process, each rule comprising a condition of at least one process signal of the industrial process and a fault which corresponds to a condition of at least one process signal;
   means for identifying which process signals of the industrial process are available to the field device;
   means for selectively removing a rule from the plurality of rules of the rule base to produce the reduced rule set, wherein the step of selectively removing a rule is based upon the step of identifying which process signals of the industrial are available; and
   means for storing the reduced rule set in a memory of the field device;
   means for performing diagnostics in the field device based upon the reduced rule set and the identification process signals.

12. The apparatus of claim 11 including means for identifying rules within the reduced rule set having identical process signal conditions.

13. The apparatus of claim 12 including means for combining rules in the reduced rule set which have identical process signal conditions.

14. The apparatus of claim 13 including means for creating a new fault for a combined rule.

15. The apparatus of claim 11 wherein the process signals comprise process variables.

16. The apparatus of claim 11 wherein the condition of at least one of the process signals comprises the group of conditions consisting of less than a constant, greater than a constant, trending up, trending down, no change and blank.

17. An industrial process diagnostic apparatus for identifying a root cause of an aberration in an industrial process, comprising:
   a rule base comprising a plurality of rules for the industrial process, each rule comprising a condition of at least one process signal of the industrial process and a fault which corresponds to a condition of at least one process signal;
   a processor configured to identify which process signals of the industrial process are available and responsively selectively remove a rule from the plurality of rules of the rule base to produce the reduced rule set, based upon the identified process signals.

18. The apparatus of claim 17 wherein the processor is further configured to identify rules within the reduced rule set having identical process signal conditions.

19. The apparatus of claim 18 wherein the process is further configured to combine rules in the reduced rule set which have identical process signal conditions.

20. The apparatus of claim 19 wherein the process is further configured to create a new fault for a combined rule.

21. The apparatus of claim 17 wherein the process signals comprise process variables.

22. The apparatus of claim 17 wherein the condition of at least one of the process signals comprises the group of conditions consisting of less than a constant, greater than a constant, trending up, trending down, no change and blank.

* * * * *

UNITED STATES PATENT AND TRADEMARK OFFICE
CERTIFICATE OF CORRECTION

PATENT NO. : 7,623,932 B2
APPLICATION NO. : 11/312103
DATED : November 24, 2009
INVENTOR(S) : Miller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 598 days.

Signed and Sealed this

Twenty-sixth Day of October, 2010

David J. Kappos
*Director of the United States Patent and Trademark Office*